US011294557B2

(12) United States Patent
Cao et al.

(10) Patent No.: US 11,294,557 B2
(45) Date of Patent: Apr. 5, 2022

(54) TEAM CONFIGURATION METHOD, AND METHOD AND APPARATUS FOR SHARING TEAM CONFIGURATION SOLUTION

(71) Applicant: Alibaba Group Holding Limited, Grand Cayman (KY)

(72) Inventors: Junyue Cao, Hangzhou (CN); Zhenhao Wu, Hangzhou (CN); Xinglin Ma, Hangzhou (CN); Guangqian Dong, Hangzhou (CN); Yida Zhao, Hangzhou (CN); Wei Sun, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/706,555

(22) Filed: Dec. 6, 2019

(65) Prior Publication Data
US 2020/0110533 A1    Apr. 9, 2020

Related U.S. Application Data

(63) Continuation of application No. PCT/CN2018/088634, filed on May 28, 2018.

(30) Foreign Application Priority Data

Jun. 9, 2017    (CN) .......................... 201710432080.1

(51) Int. Cl.
*G06F 3/0484*    (2013.01)
*G06F 3/0482*    (2013.01)
*H04L 29/06*     (2006.01)

(52) U.S. Cl.
CPC ........ *G06F 3/04847* (2013.01); *G06F 3/0482* (2013.01); *H04L 65/403* (2013.01)

(58) Field of Classification Search
CPC ... H04L 12/1822; H04L 67/18; H04L 65/403; H04L 41/0803; G06Q 10/10
See application file for complete search history.

(56) References Cited

U.S. PATENT DOCUMENTS

| | | | |
|---|---|---|---|
| 6,105,063 A | 8/2000 | Hayes, Jr. | |
| 7,516,411 B2 | 4/2009 | Beaton et al. | |
| 7,669,177 B2 | 2/2010 | Gerber et al. | |
| 7,685,530 B2 | 3/2010 | Sherrard et al. | |

(Continued)

FOREIGN PATENT DOCUMENTS

| | | |
|---|---|---|
| CN | 104391687 A | 3/2015 |
| CN | 104503747 A | 4/2015 |

(Continued)

OTHER PUBLICATIONS

Translation of CN Office Action from Corresponding CN Application No. 201710432080.1 dated Jul. 31, 2020, a counterpart foreign application for U.S. Appl. No. 16/706,555 , 8 pages.

(Continued)

*Primary Examiner* — Mong-Shune Chung
(74) *Attorney, Agent, or Firm* — Lee & Hayes, P.C.

(57) ABSTRACT

A team configuration method including creating a team according to a received team creation instruction; obtaining alternative function configuration schemes applicable to the team; and selecting at least one function configuration scheme from the alternative function configuration schemes such that the selected function configuration scheme is applied to configure the functions of the team. Through the technical solution of the present disclosure, the team configuration efficiency is improved.

20 Claims, 30 Drawing Sheets

(56) References Cited

U.S. PATENT DOCUMENTS

| | | |
|---|---|---|
| 7,904,322 B2 | 3/2011 | Gauger |
| 7,918,738 B2 | 4/2011 | Paulsen |
| 8,190,999 B2 | 5/2012 | Chen |
| 9,563,336 B2 | 2/2017 | Barak et al. |
| 2005/0262199 A1 | 11/2005 | Chen |
| 2011/0214074 A1* | 9/2011 | Pegg ............... G06Q 10/10 715/758 |
| 2012/0042013 A1* | 2/2012 | Roman ............. G06Q 10/10 709/204 |
| 2014/0129637 A1* | 5/2014 | Rohrs ................ G06F 9/54 709/204 |
| 2015/0373143 A1 | 12/2015 | Rajakarunanayake et al. |
| 2018/0077542 A1* | 3/2018 | Xie ..................... H04W 4/12 |
| 2018/0300305 A1* | 10/2018 | Lam .................. G06F 40/186 |
| 2019/0342172 A1* | 11/2019 | Bower, III ........ H04L 41/0886 |

FOREIGN PATENT DOCUMENTS

| | | |
|---|---|---|
| CN | 104993998 A | 10/2015 |
| CN | 105787022 A | 7/2016 |
| CN | 106060165 A | 10/2016 |
| CN | 106453059 | 2/2017 |
| EP | 0756237 A | 1/1997 |
| WO | WO2016190726 A1 | 12/2016 |

OTHER PUBLICATIONS

Translation of International Search Report for corresponding PCT Application PCT/CN2018/088634, dated Aug. 29, 2018, a counterpart foreign application for U.S. Appl. No. 16/706,555 , 3 pages.

Translation of Written Opinion for corresponding PCT Application PCT/CN2018/088634, dated Aug. 29, 2018, a counterpart foreign application for U.S. Appl. No. 16/706,555 , 4 pages.

Translation of CN Search Report from Corresponding CN Application No. 201710432080.1 dated Jul. 27, 2020, a counterpart foreign application for U.S. Appl. No. 16/706,555 , 1 page.

Translation of CN Office Action from Corresponding CN Application No. 201710432080.1 dated Apr. 9, 2021, a counterpart foreign application for U.S. Appl. No. 16/706,555 , 9 pages.

* cited by examiner

SELECT TARGET FUNCTION CONFIGURATION SCHEME FROM FUNCTION
CONFIGURATION SCHEMES ASSOCIATED WITH TEAM SUCH THAT TARGET FUNCTION
CONFIGURATION SCHEME IS APPLIED TO CONFIGURE FUNCTIONS OF TEAM
S602

FIG. 6

TEAM CREATION INTERFACE 702

| Cancel | Create Team |
|---|---|

Team Name  Enterprise AA

Industry                                    Catering  >

Enterprise Size  30-100 persons         >

Region                                      Hangzhou  >

Team Member (1)

(+)  Add team member        5 persons to be added  >

(A)  A

In order to better experience Enterprise Instant Messaging, team should have 6 or more persons:

The system will send invitation message to unregistered members:

[ Create team now ]

FIG. 7

GENERATE FUNCTION CONFIGURATION SCHEME CORRESPONDING TO TEAM
ACCORDING TO FUNCTIONS ADOPTED BY TEAM
S1502A

SHARE FUNCTION CONFIGURATION SCHEME TO SHARED PLATFORM SUCH
THAT FUNCTION CONFIGURATION SCHEME IS PUSHED BY SHARED
PLATFORM TO ANOTHER TEAM TO CONFIGURE FUNCTIONS OF ANOTHER
TEAM; OR SHARE FUNCTION CONFIGURATION SCHEME TO SHARED
PLATFORM TO CONFIGURE FUNCTIONS OF ANOTHER TEAM, WHEREIN
ANOTHER TEAM HAS ACCESS PERMISSION TO SHARED PLATFORM
S1504A

FIG. 15A

DETERMINE FUNCTION CONFIGURATION SCHEME ADOPTED BY TEAM
S1502B

SHARE FUNCTION CONFIGURATION SCHEME TO SHARED PLATFORM SUCH THAT FUNCTION CONFIGURATION SCHEME IS PUSHED BY SHARED PLATFORM TO ANOTHER TEAM TO CONFIGURE FUNCTIONS OF ANOTHER TEAM; OR SHARE FUNCTION CONFIGURATION SCHEME TO SHARED PLATFORM TO CONFIGURE FUNCTIONS OF ANOTHER TEAM, WHEREIN ANOTHER TEAM HAS ACCESS PERMISSION TO SHARED PLATFORM
S1504B

FIG. 15B

TEAM CONFIGURATION
APPARATUS
1812

FOURTH SELECTING UNIT
2302

FIG. 23

TEAM CONFIGURATION METHOD, AND METHOD AND APPARATUS FOR SHARING TEAM CONFIGURATION SOLUTION

CROSS REFERENCE TO RELATED PATENT APPLICATIONS

This application claims priority to and is a continuation of PCT Patent Application No. PCT/CN2018/088634, filed on 28 May 2018 and entitled "TEAM CONFIGURATION METHOD, AND METHOD AND APPARATUS FOR SHARING TEAM CONFIGURATION SOLUTION," which claims priority to Chinese Patent Application No. 201710432080.1 filed on 9 Jun. 2017 and titled "TEAM CONFIGURATION METHOD, AND METHOD AND APPARATUS FOR SHARING TEAM CONFIGURATION SOLUTION," which are incorporated herein by reference in their entirety.

TECHNICAL FIELD

The present disclosure relates to the technical field of communications, and, more particularly, to team configuration methods, and methods and apparatuses for sharing a team configuration scheme.

BACKGROUND

In conventional techniques, a team concept is proposed, and team members can realize quick communication through the team. For example, by only sending a message notification for the team, all the team members can obtain the corresponding notification content without separately communicating with each team member individually, which greatly improves communication efficiency. For example, in conventional techniques, mobile group office platforms have been more and more widely used in the office working processes of various groups, such as enterprises, educational institutions, and government agencies. By creating a team based on the mobile group office platform, communication efficiency between team members can be improved and communication costs can be reduced.

With the continuous development of team-conventional techniques, teams in the conventional techniques have been able to implement more and more functions, such as attendance check, conference calls, and daily work reports within the teams, which can effectively improve the event processing efficiency and office working efficiency of team members.

When there is a small number of functions, all of the functions may be configured for each team; however, as more and more team-related functions become available, configuring all functions for each team will hinder team members in quickly enabling required functions. This causes a decrease in efficiency. Therefore, different teams should select and configure the actually required functions according to their actual needs.

However, due to the large number of functions, it is difficult to understand or try out various functions one by one, which is not conducive to the team's convenient configuration operation of functions.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides team configuration methods and methods and apparatuses for sharing a team configuration scheme, thereby improving the configuration efficiency for teams.

The present disclosure provides the technical solutions as follows:

According to an example embodiment of the present disclosure, a team configuration method is provided, including:

creating a team according to a received team creation instruction;

obtaining alternative function configuration schemes applicable to the team; and selecting at least one function configuration scheme from the alternative function configuration schemes such that the selected function configuration scheme is applied to configure functions of the team.

According to an example embodiment of the present disclosure, a team configuration method is provided, including:

obtaining alternative function configuration schemes applicable to a team; and selecting at least one function configuration scheme from the alternative function configuration schemes such that the selected function configuration scheme is applied to configure functions of the team.

According to an example embodiment of the present disclosure, a team configuration method is provided, including:

obtaining alternative configuration schemes applicable to a team; and selecting at least one configuration scheme from the alternative configuration schemes such that the selected configuration scheme is applied to configure the team.

According to an example embodiment of the present disclosure, a team configuration method is provided, including:

receiving a scheme switching instruction for a team; and determining, from function configuration schemes associated with the team, a target function configuration scheme indicated by the scheme switching instruction such that the target function configuration scheme is applied to configure functions of the team.

According to an example embodiment of the present disclosure, a team configuration method is provided, including:

selecting a target function configuration scheme from function configuration schemes associated with a team such that the target function configuration scheme is applied to configure functions of the team.

According to an example embodiment of the present disclosure, a method for sharing a team configuration scheme is provided, including:

generating a function configuration scheme corresponding to a team according to functions adopted by the team; and sharing the function configuration scheme to another team to configure functions of the other team.

According to an example embodiment of the present disclosure, a method for sharing a team configuration scheme is provided, including:

determining a function configuration scheme adopted by a team; and sharing the function configuration scheme to another team to configure functions of the other team.

According to an example embodiment of the present disclosure, a method for sharing a team configuration scheme is provided, including:

generating a function configuration scheme corresponding to a team according to functions adopted by the team; and sharing the function configuration scheme to a shared platform such that the function configuration scheme is pushed by the shared platform to another team to configure functions of the other team; or sharing the function configuration scheme to the shared platform to configure the functions of the other team, wherein the other team has an access permission to the shared platform.

According to an example embodiment of the present disclosure, a method for sharing a team configuration scheme is provided, including:

determining a function configuration scheme adopted by a team; and sharing the function configuration scheme to a shared platform such that the function configuration scheme is pushed by the shared platform to another team to configure functions of the other team; or sharing the function configuration scheme to the shared platform to configure the functions of the other team, wherein the other team has an access permission to the shared platform.

According to an example embodiment of the present disclosure, a team configuration apparatus is provided, including:

a creating unit configured to create a team according to a received team creation instruction;

a first obtaining unit configured to obtain alternative function configuration schemes applicable to the team; and a first selecting unit configured to select at least one function configuration scheme from the alternative function configuration schemes such that the selected function configuration scheme is applied to configure functions of the team.

According to an example embodiment of the present disclosure, a team configuration apparatus is provided, including:

a second obtaining unit configured to obtain alternative function configuration schemes applicable to a team; and a second selecting unit configured to select at least one function configuration scheme from the alternative function configuration schemes such that the selected function configuration scheme is applied to configure functions of the team.

According to an example embodiment of the present disclosure, a team configuration apparatus is provided, including:

a third obtaining unit configured to obtain alternative configuration schemes applicable to a team; and a third selecting unit configured to select at least one configuration scheme from the alternative configuration schemes such that the selected configuration scheme is applied to configure the team.

According to an example embodiment of the present disclosure, a team configuration apparatus is provided, including:

a switching instruction receiving unit configured to receive a scheme switching instruction for a team; and a switching unit configured to determine, from function configuration schemes associated with the team, a target function configuration scheme indicated by the scheme switching instruction such that the target function configuration scheme is applied to configure functions of the team.

According to an example embodiment of the present disclosure, a team configuration apparatus is provided, including:

a fourth selecting unit configured to select a target function configuration scheme from function configuration schemes associated with a team such that the target function configuration scheme is applied to configure functions of the team.

According to an example embodiment of the present disclosure, an apparatus for sharing a team configuration scheme is provided, including:

a first generating unit configured to generate a function configuration scheme corresponding to a team according to functions adopted by the team; and a first sharing unit configured to share the function configuration scheme to another team to configure functions of the other team.

According to an example embodiment of the present disclosure, an apparatus for sharing a team configuration scheme is provided, including:

a first scheme determining unit configured to determine a function configuration scheme adopted by a team; and a second sharing unit configured to share the function configuration scheme to another team to configure functions of the other team.

According to an example embodiment of the present disclosure, an apparatus for sharing a team configuration scheme is provided, including:

a second generating unit configured to generate a function configuration scheme corresponding to a team according to functions adopted by the team; and a third sharing unit configured to share the function configuration scheme to a shared platform such that the function configuration scheme is pushed by the shared platform to another team to configure the functions of the other team; or share the function configuration scheme to the shared platform to configure the functions of the other team, wherein the other team has an access permission to the shared platform.

According to an example embodiment of the present disclosure, \ an apparatus for sharing a team configuration scheme is provided, including:

a second scheme determining unit configured to determine a function configuration scheme adopted by a team; and a fourth sharing unit configured to share the function configuration scheme to a shared platform such that the function configuration scheme is pushed by the shared platform to another team to configure functions of the other team; or share the function configuration scheme to the shared platform to configure the functions of other team, wherein the other team has an access permission to the shared platform.

As shown from the above technical solutions, the present disclosure provides alternative function configuration schemes for a team, so that functions applicable to the team can be quickly configured without the need to understand or try out all the functions one by one, which greatly improves the efficiency of configuring the team.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely represent some of the example embodiments of the present disclosure, and persons of ordinary skill in the art may derive other drawings from these accompanying drawings without creative efforts.

FIG. 6 is a flowchart of a yet another team configuration method according to an example embodiment of the present disclosure;

FIG. 7 is a schematic diagram of a team creation interface according to an example embodiment of the present disclosure;

FIG. 15A is a flowchart of a yet another method for sharing a team configuration scheme according to an example embodiment of the present disclosure;

FIG. 15B is a flowchart of a yet another method for sharing a team configuration scheme according to an example embodiment of the present disclosure;

FIG. 23 is a yet another block diagram of a team configuration apparatus according to an example embodiment of the present disclosure;

DETAILED DESCRIPTION

Example embodiments will be described in detail herein, examples of which are illustrated in figures. When the following description refers to figures, same numerals in different figures refer to the same or similar elements, unless otherwise indicated. The implementations described in the following example embodiments do not represent all embodiments consistent with the present disclosure. Instead, they are merely examples of devices and methods consistent with some aspects, as detailed in the appended claims, of the present disclosure.

According to the present disclosure, by providing alternative function configuration schemes to a team, it can allow the team to quickly configure functions of the team by simply selecting a function configuration scheme from the alternative function configuration schemes, without the need to view and select functions one by one from a large number of functions. This h not only helps to improve team configuration efficiency, but also ensures the functions included in the alternative function configuration scheme to be more appropriate to the actual needs of the team.

In order to further illustrate the present disclosure, the following embodiments are provided.

Figure 1:
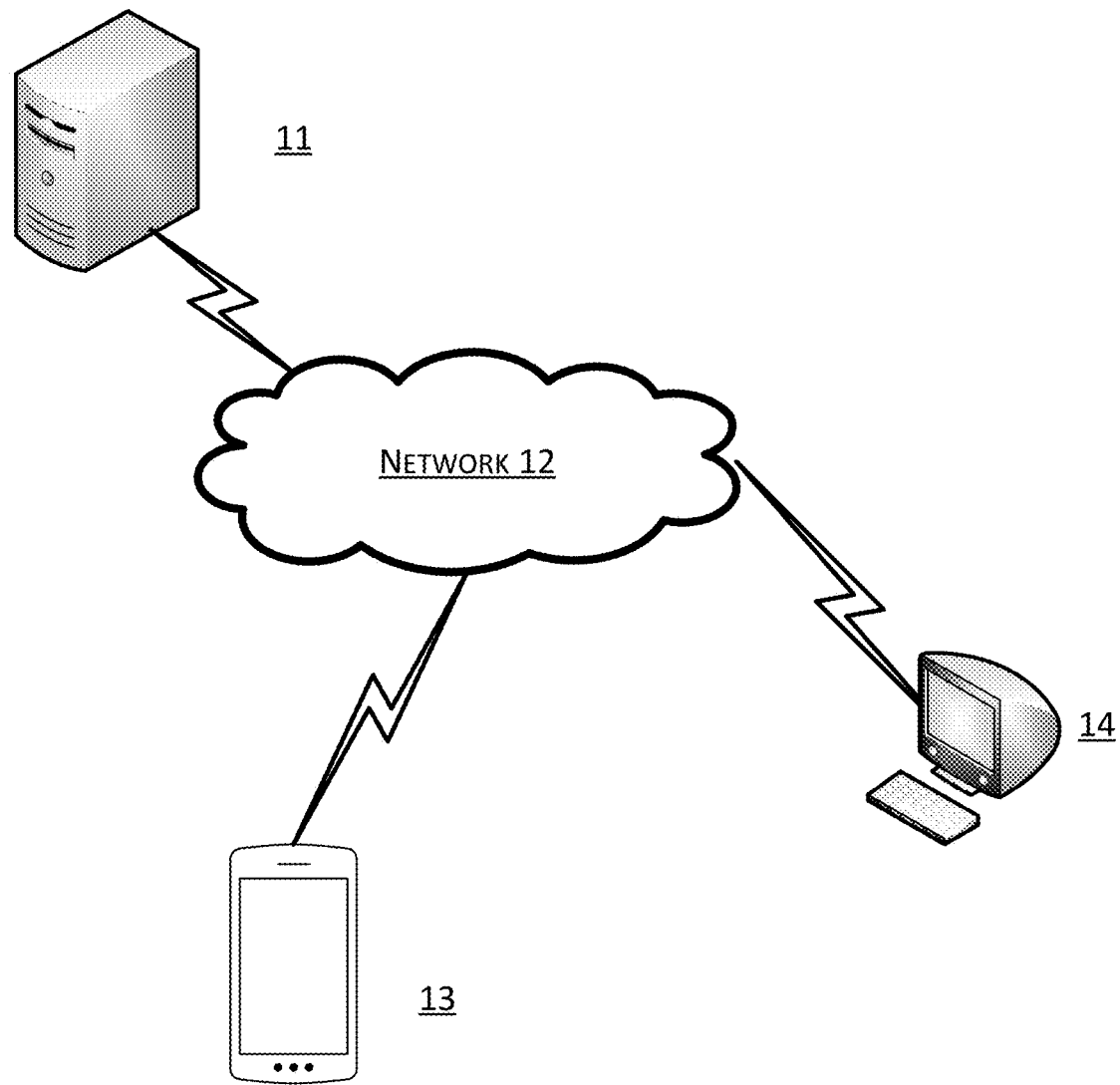
FIG. 1 is a schematic architecture diagram of a team configuration system according to an example embodiment of the present disclosure.

FIG. 1 is a schematic architecture diagram of a team configuration system according to an example embodiment of the present disclosure. As shown in FIG. 1, the system may include a server 11, a network 12, and a plurality of electronic devices, such as a mobile phone 13, and a PC 14.

The server 11 may be a physical server including a separate host, or the server 11 may be a virtual server hosted by a host cluster, or the server 11 may be a cloud server. During operation, the server 11 may run a server-side program of an application to implement related functions of the application. For example, when running the program of a mobile group office platform, the server 11 may be implemented as a server terminal of the mobile group office platform. In the technical solution of the present disclosure, the server 11 can cooperate with a client terminal running on the mobile phone 13 and the PC 14 to implement team configuration or share a team configuration scheme; certainly, in some embodiments, the server 11 may also implement team configuration or share a team configuration scheme only on the server side without the need to cooperate with a client terminal.

The mobile group office platform here not only may realize the communication function, but also may be used as an integrated function platform of many other functions, for example, for processing internal events of an team, such as approval events (such as leave, office supply application, financial and other approval events), attendance events, task events and log events, and for another example, for processing external events of the team, such as meal ordering and purchasing, which is not limited in the present disclosure.

More specifically, the mobile group office platforms may be hosted in instant messaging applications in conventional techniques, for example, Enterprise Instant Messaging (EIM) applications such as Skype For Business®, Microsoft Teams®, Yammer®, Workplace®, Slack®, Enterprise WeChat®, Fxiaoke®, Enterprise Fetion®, Enterprise Easychat® and the like. Certainly, the instant messaging function is only one of the communication functions supported by the mobile group office platform. The group office platform can also implement more functions as mentioned above, which will not be elaborated here.

The mobile phone 13 or the PC 14 is just one type of electronic devices that may be used by users. In fact, users apparently may also use such electronic devices as tablet devices, notebook computers, PDAs (Personal Digital Assistants), wearable devices (such as smart glasses and smart watches), etc., which is not limited by the present disclosure. During operation, the electronic device may run a client-side program of an application to implement related functions of the application. For example, when running the program of a mobile group office platform, the electronic device may be implemented as a client terminal of the mobile group office platform. It should be noted that the application at a client terminal of the mobile group office platform may be pre-installed on the electronic device so that the client terminal may be enabled and run on the electronic device. Certainly, when using an on-line "client terminal" such as HTML5 technology", the client terminal may be obtained and run without installing the corresponding application on the electronic device.

The network 12 in which the mobile phone 13 and the PC 14 interact with the server 11 may include various types of wired or wireless networks. In an embodiment, the network 12 may include a Public Switched Telephone Network (PSTN) and the Internet. Moreover, the electronic devices such as the mobile phone 13 and the PC 14 may also perform communication interaction with each other through the network 12, by, for example, establishing a private chat communication session between any two electronic devices; or, a plurality of electronic devices may participate in a group chat communication session corresponding to the same team, so that any team member may send a communication message to all other team members in the group chat communication session through his/her own electronic device.

The process of configuring the functions of a team in the present disclosure will be described below with reference to the embodiments.

Figure 2:
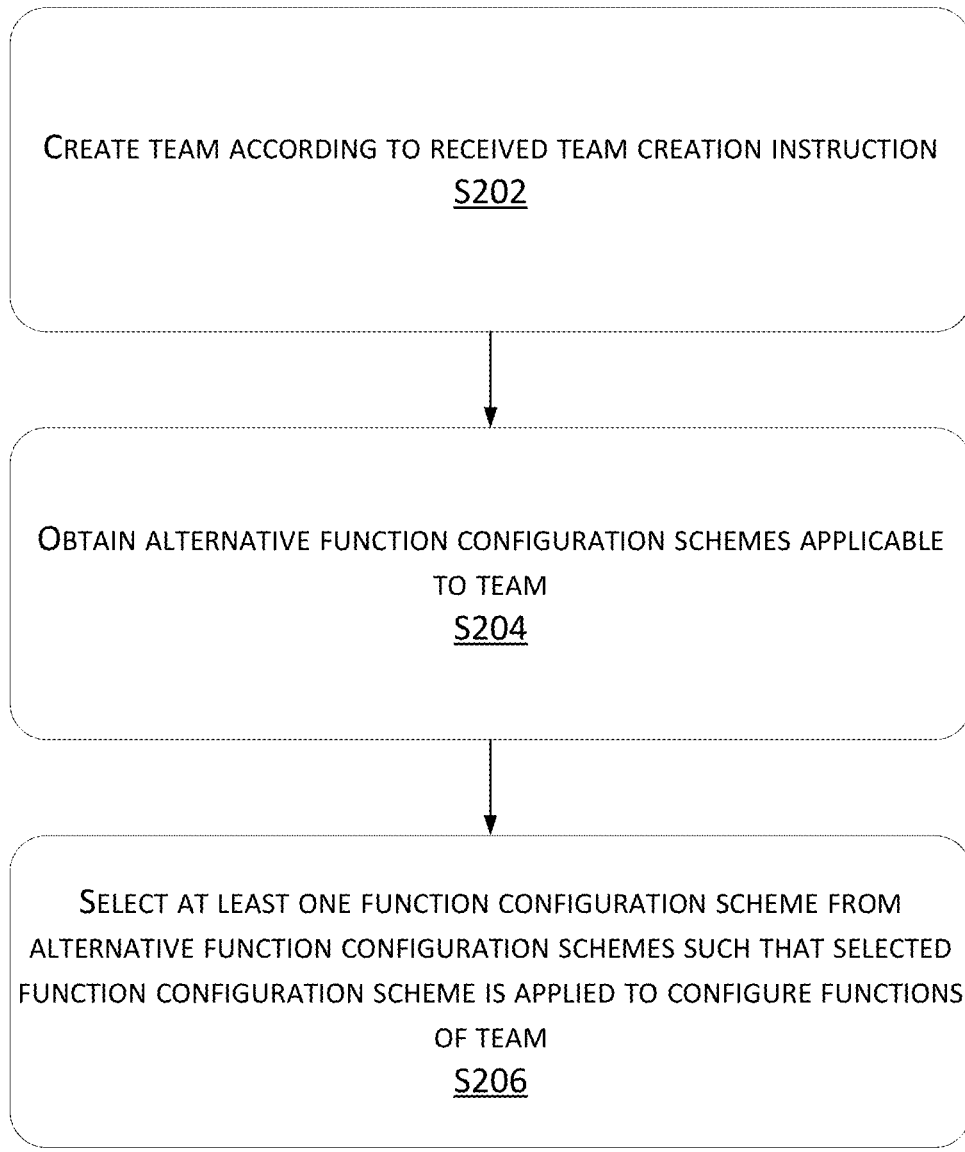
FIG. 2 is a flowchart of a team configuration method according to an example embodiment of the present disclosure.

FIG. 2 is a flowchart of a team configuration method according to an example embodiment of the present disclosure. As shown in FIG. 2, the method may be applied to, for example, the server 11 shown in FIG. 1, and may also be applied to, for example, the mobile phone 13 or the PC 14 shown in FIG. 1, and the method may include the following steps.

In step 202, a team is created according to a received team creation instruction.

In this embodiment, the techniques assist the team to quickly and conveniently complete configuration operation by providing alternative function configuration schemes applicable to the team during the process of creating the team or after the team creation is just completed. Certainly, in other embodiments, alternative function configuration schemes applicable to the team may be provided at any other time to implement function configuration of the team.

In step 204, alternative function configuration schemes applicable to the team are obtained.

In this embodiment, it can assist a creator or other administrator of the team as much as possible by actively providing corresponding alternative function configuration schemes. Certainly, in other embodiments, the creator or other administrator of the team may also actively obtain alternative function configuration schemes to implement the function configuration of the team.

In this embodiment, a team type to which the team belongs may be determined according to attribute information of the team; and then function configuration schemes corresponding to the team type are obtained as the alternative function configuration schemes. For example, the attribute information of the team may include at least one of: geographical location information, the number of members, team affiliation information, industry affiliation information, etc., which is not limited by the present disclosure; only one single type of attribute information of the team may be referred to, or multiple types of attribute information of the team may also be referred to. Taking "industry affiliation information" as an example, when the above-mentioned team belongs to the catering industry, function configuration schemes applicable to the catering industry rather than function configuration schemes applicable to the logistics industry may be used as alternative function configuration schemes of the team. Certainly, function configuration schemes in some industries may also be applicable to other industries. For example, the function configuration schemes applicable to the Internet industry may also be applicable to the traditional industry, and the present disclosure does not limit this.

In this embodiment, for the "geographical location information" attribute of the team, it may be understood that although the "team" itself may not be an entity, associated geographical location information may still be configured for the team; for example, the geographical location information may be an area in which a team creator is located, an area in which the team members are located, or any area set by a team administrator, etc., which is not limited by the present disclosure.

In this embodiment, for the "team affiliation information" attribute of the team, the "team" may include various organizations such as an enterprise, a school, a military unit, a hospital, and an institution, which is not limited by the present disclosure. For example, in the case of an enterprise, a team that includes all employees of the enterprise may be created or a team that includes enterprise employees of a certain division.

In this embodiment, for the "industry affiliation information" attribute of the team, the "industry" may be understood from different fine granularities. For example, in a larger fine granularity, the industry may be divided into different organization types such as an enterprise, a school, a military unit, a hospital, and an institution; in a smaller fine granularity, such as the "enterprise" may be further divided into the catering industry, the logistics industry, Internet industry, etc.

In this embodiment, the alternative function configuration schemes may include at least one of: a preset function configuration scheme, and function configuration schemes adopted by other teams. The preset function configuration scheme here may be a predefined function configuration scheme on a server terminal, and all the teams may view and use the preset function configuration scheme at any time. Moreover, by referring to the function configuration schemes adopted by other teams, especially when the other teams or groups to which the other teams belong have a good development state, the function configuration scheme will have greater reference significance and has greater possibility to help the above-mentioned teams to improve the efficiency.

In step 206, at least one function configuration scheme is selected from the alternative function configuration schemes such that the selected function configuration scheme is applied to configure the functions of the team.

In this embodiment, the function may include any function associated with the team for implementing a corresponding business event or non-business event. The association relationship may be embodied in multiple aspects. For example, in an implementation, an association display interface of the team may include a control entry for the functions, so that team members can call the corresponding function or enter the control interface of the function, etc., by triggering the control entry; in another implementation, members of the team may have control permissions to the function; for example, when the function is associated with the team, the members of the team may be given control permissions to the function, and for functions unconcerned to the team, the members of the team may not have the corresponding control permissions, thus being unable to control the corresponding functions.

In this embodiment, the team may belong to a preset group, such as an enterprise team belonging to a preset enterprise, and a school team belonging to a preset school. Certainly, the team of the present disclosure is not limited to a team within the group, but may also include other teams in the related technology, such as hobby teams, dating teams, and other teams that are not related to the group.

In this embodiment, update data for the selected function configuration scheme may be received, and functions configured for the team are updated according to the update data to maintain the configuration status of the team up to date. The update data here may be derived from a scheme update operation implemented by a creator of the selected function configuration scheme; for example, when the function configuration scheme is derived from function configuration schemes shared by other teams, if other teams update their functions through the scheme update operation, the functions of the above team may be updated automatically. Certainly, the update operation based on the update data may be automatically executed; or an update prompt may be sent to the administrator of the above team, and then it is determined to perform the update or ignore the update according to the response of the administrator.

Figure 3:
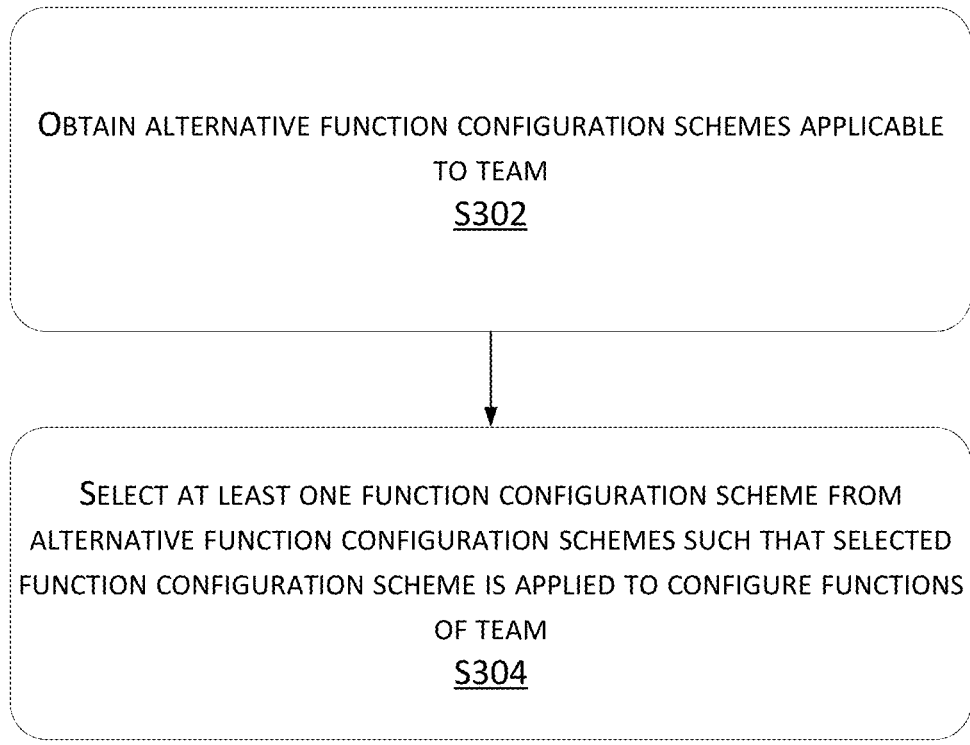
FIG. 3 is a flowchart of another team configuration method according to an example embodiment of the present disclosure.

FIG. 3 is a flowchart of another team configuration method according to an example embodiment of the present disclosure. As shown in FIG. 3, the method may be applied to, for example, the server 11 shown in FIG. 1, and may also be applied to, for example, the mobile phone 13 or the PC 14 shown in FIG. 1, and the method may include the following steps.

In step 302, alternative function configuration schemes applicable to the team are obtained.

In this embodiment, it can assist the team to quickly and conveniently complete configuration operation by providing alternative function configuration schemes applicable to the team during the process of creating the team or after the team creation is just completed. Certainly, in other embodiments, alternative function configuration schemes applicable to the team may be provided at any other time to implement function configuration of the team.

In this embodiment, it can assist a creator or other administrator of the team as much as possible by actively providing corresponding alternative function configuration schemes. Certainly, in other embodiments, the creator or other administrator of the team may also actively obtain alternative function configuration schemes to implement the function configuration of the team.

In this embodiment, a team type to which the team belongs may be determined according to attribute information of the team; and then function configuration schemes corresponding to the team type are obtained as the alternative function configuration schemes. For example, the attribute information of the team may include at least one of: geographical location information, the number of members, team affiliation information, industry affiliation information, etc., which is not limited by the present disclosure; only one single type of attribute information of the team may be referred to, or multiple types of attribute information of the team may also be referred to. Taking "industry affiliation information" as an example, when the above-mentioned team belongs to the catering industry, function configuration schemes applicable to the catering industry rather than function configuration schemes applicable to the logistics industry may be used as alternative function configuration schemes of the team. Certainly, function configuration schemes in some industries may also be applicable to other industries. For example, the function configuration schemes applicable to the Internet industry may also be applicable to the traditional industry, and the present disclosure does not limit this.

In this embodiment, for the "geographical location information" attribute of the team, it may be understood that although the "team" itself may not be an entity, associated geographical location information may still be configured for the team; for example, the geographical location information may be an area in which a team creator is located, an area in which the team members are located, or any area set by a team administrator, etc., which is not limited by the present disclosure.

In this embodiment, for the "team affiliation information" attribute of the team, the "team" may include various organizations such as an enterprise, a school, a military unit, a hospital, and an institution, which is not limited by the present disclosure. For example, in the case of an enterprise, a team that includes all employees of the enterprise may be created or a team that includes enterprise employees of a certain division.

In this embodiment, for the "industry affiliation information" attribute of the team, the "industry" may be understood from different fine granularities. For example, in a larger fine granularity, the industry may be divided into different organization types such as an enterprise, a school, a military unit, a hospital, and an institution; in a smaller fine granularity, such as the "enterprise" may be further divided into the catering industry, the logistics industry, Internet industry, etc.

In this embodiment, the alternative function configuration schemes may include at least one of: a preset function configuration scheme, and function configuration schemes adopted by other teams. The preset function configuration scheme here may be a predefined function configuration scheme on a server terminal, and all the teams may view and use the preset function configuration scheme at any time. Moreover, by referring to the function configuration schemes adopted by other teams, especially when the other teams or groups to which the other teams belong have a good development state, the function configuration scheme will have greater reference significance and has greater possibility to help the above-mentioned teams to improve the efficiency.

In step 304, at least one function configuration scheme is selected from the alternative function configuration schemes such that the selected function configuration scheme is applied to configure the functions of the team.

In this embodiment, the function may include any function associated with the team for implementing a corresponding business event or non-business event. The association relationship may be embodied in multiple aspects. For example, in an implementation, an association display interface of the team may include a control entry for the functions, so that team members can call the corresponding function or enter the control interface of the function, etc., by triggering the control entry; in another implementation, members of the team may have control permissions to the function; for example, when the function is associated with the team, the members of the team may be given control permissions to the function, and for functions unconcerned to the team, the members of the team may not have the corresponding control permissions, thus being unable to control the corresponding functions.

In this embodiment, the team may belong to a preset group, such as an enterprise team belonging to a preset enterprise, and a school team belonging to a preset school. Certainly, the team of the present disclosure is not limited to a team within the group, but may also include other teams in the related technology, such as hobby teams, dating teams, and other teams that are not related to the group.

In this embodiment, update data for the selected function configuration scheme may be received, and functions configured for the team are updated according to the update data to maintain the configuration status of the team up to date. The update data here may be derived from a scheme update operation implemented by a creator of the selected function configuration scheme; for example, when the function configuration scheme is derived from function configuration schemes shared by other teams, if other teams update their functions through the scheme update operation, the functions of the above team may be updated automatically. Certainly, the update operation based on the update data may be automatically executed; or an update prompt maybe sent to the administrator of the above team, and then it is determined to perform the update or ignore the update according to the response of the administrator.

Figure 4:
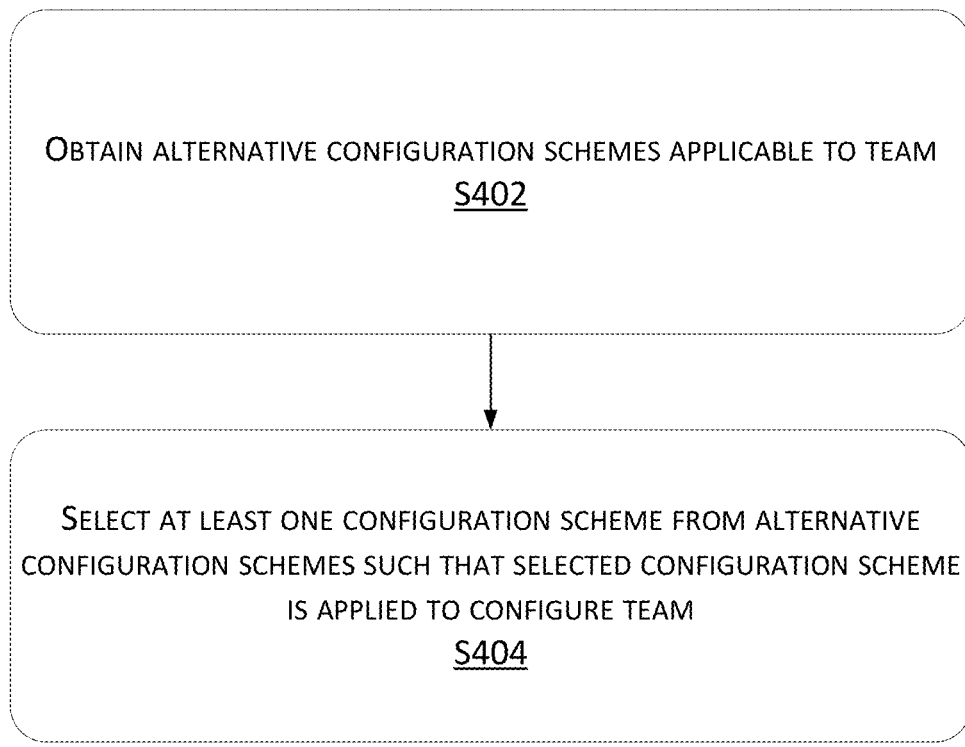
FIG. 4 is a flowchart of a yet another team configuration method according to an example embodiment of the present disclosure.

FIG. 4 is a flowchart of a yet another team configuration method according to an example embodiment of the present disclosure. As shown in FIG. 4, the method may be applied to, for example, the server 11 shown in FIG. 1, and may also be applied to, for example, the mobile phone 13 or the PC 14 shown in FIG. 1, and the method may include the following steps.

In step 402, alternative configuration schemes applicable to a team are obtained.

In this embodiment, it can assist the team to quickly and conveniently complete configuration operation by providing alternative configuration schemes applicable to the team during the process of creating the team or after the team creation is just completed. Certainly, in other embodiments, alternative configuration schemes applicable to the team may be provided at any other time to implement configuration of the team.

In this embodiment, it can assist a creator or other administrator of the team as much as possible by actively providing corresponding alternative configuration schemes. Certainly, in other embodiments, the creator or other administrator of the team may also actively obtain alternative configuration schemes to implement the configuration of the team.

In this embodiment, a team type to which the team belongs may be determined according to attribute information of the team; and then function configuration schemes corresponding to the team type are obtained as the alternative configuration schemes. For example, the attribute information of the team may include at least one of: geographical location information, the number of members, team affiliation information, industry affiliation information, etc., which is not limited by the present disclosure; only one single type of attribute information of the team may be referred to, or multiple types of attribute information of the team may also be referred to. Taking "industry affiliation information" as an example, when the above-mentioned team belongs to the catering industry, configuration schemes applicable to the catering industry rather than configuration schemes applicable to the logistics industry may be used as alternative function configuration schemes of the team. Certainly, configuration schemes in some industries may also be applicable to other industries. For example, configuration schemes applicable to the Internet industry may also be applicable to the traditional industry, and the present disclosure does not limit this.

In this embodiment, for the "geographical location information" attribute of the team, it may be understood that although the "team" itself may not be an entity, associated geographical location information may still be configured for the team; for example, the geographical location information may be an area in which a team creator is located, an area in which the team members are located, or any area set by a team administrator, etc., which is not limited by the present disclosure.

In this embodiment, for the "team affiliation information" attribute of the team, the "team" may include various organizations such as an enterprise, a school, a military unit, a hospital, and an institution, which is not limited by the present disclosure. For example, in the case of an enterprise, a team that includes all employees of the enterprise may be created or a team that includes enterprise employees of a certain division.

In this embodiment, for the "industry affiliation information" attribute of the team, the "industry" may be understood from different fine granularities. For example, in a larger fine granularity, the industry may be divided into different organization types such as an enterprise, a school, a military unit, a hospital, and an institution; in a smaller fine granularity, such as the "enterprise" may be further divided into the catering industry, the logistics industry, Internet industry, etc.

In this embodiment, the alternative configuration schemes may include at least one of: a preset configuration scheme, and configuration schemes adopted by other teams. The preset configuration scheme here may be a predefined function configuration scheme on a server terminal, and all the teams may view and use the preset function configuration scheme at any time. Moreover, by referring to the configuration schemes adopted by other teams, especially when the other teams or groups to which the other teams belong have a good development state, the configuration scheme will have greater reference significance and has greater possibility to help the above-mentioned teams to improve the efficiency.

In step 404, at least one configuration scheme is selected from the alternative configuration schemes such that the selected configuration scheme is applied to configure the team.

In this embodiment, the configuration scheme may include any type of scheme. For example, the configuration scheme may include a function configuration scheme which may be referred to for configuring the function of the team. For another example, the configuration scheme may include other types of configuration schemes, such as an interface configuration scheme, and the interface configuration scheme may be referred to for configuring a content layout of the associated display interface of the team. For yet another example, the configuration scheme may include an organizational structure configuration scheme, which may be referred to for configuring the organizational structure of the team. The types of configuration schemes will not be listed here one by one. In fact, all the schemes related to the team configuration may be included in the configuration scheme of the present disclosure.

In this embodiment, the configuration scheme may be used only for configuration of the team in a single dimension, such as configuring a function, etc.; or, the configuration scheme may also be used to configure multiple dimensions of the team, such as simultaneously configuring the function, the content layout of an associated display interface, etc.

In this embodiment, the team may belong to a preset group, such as an enterprise team belonging to a preset enterprise, and a school team belonging to a preset school. Certainly, the team of the present disclosure is not limited to a team within the group, but may also include other teams in the related technology, such as hobby teams, dating teams, and other teams that are not related to the team.

In this embodiment, update data for the selected configuration scheme may be received, and the configuration of the team is updated according to the update data to maintain the configuration status of the team up to date. The update data here may be derived from a scheme update operation implemented by a creator of the selected configuration scheme; for example, when the configuration scheme is derived from function configuration schemes shared by other teams, if other teams update their configurations through the scheme update operation, the configuration of the above team may be updated automatically. Certainly, the update operation based on the update data may be automatically executed; or an update prompt may be sent to the administrator of the above team, and then it is determined to perform the update or ignore the update according to the response of the administrator.

Figure 5:
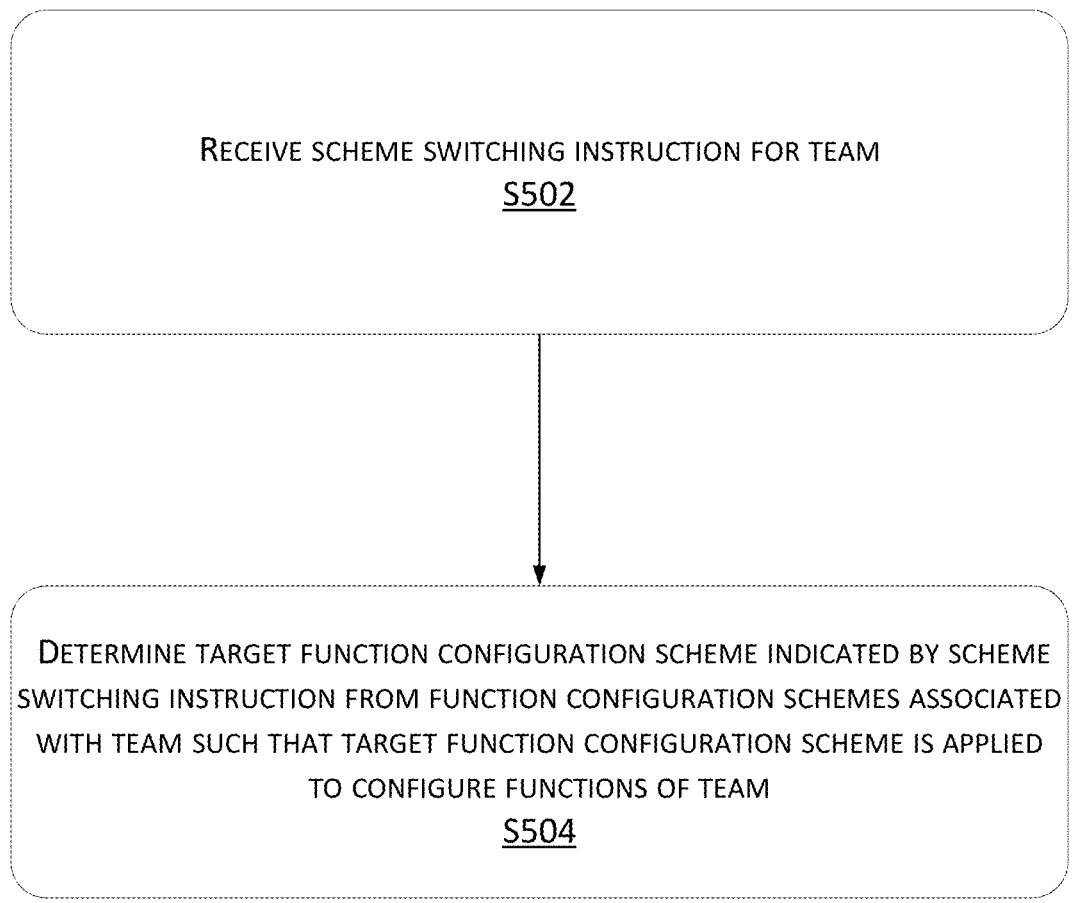
FIG. 5 is a flowchart of a yet another team configuration method according to an example embodiment of the present disclosure.

FIG. 5 is a flowchart of a yet another team configuration method according to an example embodiment of the present disclosure. As shown in FIG. 5, the method may be applied to, for example, the server 11 shown in FIG. 1, and may also be applied to, for example, the mobile phone 13 or the PC 14 shown in FIG. 1, and the method may include the following steps.

In step 502, a scheme switching instruction for a team is received.

In step 504, a target function configuration scheme indicated by the scheme switching instruction is determined from function configuration schemes associated with the team such that the target function configuration scheme is applied to configure the functions of the team.

In this embodiment, the team may have one or more associated function configuration schemes, and the alternative function configuration schemes may include at least one of: a preset function configuration scheme, and function configuration schemes adopted by other teams. The preset function configuration scheme here may be a predefined function configuration scheme on a server terminal, and all the teams may view and use the preset function configuration scheme at any time. Moreover, by referring to the function configuration schemes adopted by other teams, especially when the other teams or groups to which the other teams belong have a good development state, the function configuration scheme will have greater reference significance and has greater possibility to help the above-mentioned teams to improve the efficiency.

In this embodiment, when the team has multiple associated function configuration schemes, the function configuration scheme adopted by the team may be switched based on a scheme switching instruction. When different function configuration schemes are adopted, they may be applied to different types of environments and scenarios; for example, in an enterprise scenario, different function configuration schemes may be adopted in a working time period and a non-working time period, respectively. For example, the above-mentioned scheme switching instruction may be released by a team administrator to switch the function configuration scheme; or, the server may automatically release a scheme switching instruction according to a switching condition predefined by, for example, the administrator, to automatically switch the function configuration scheme when the switching condition is reached.

In this embodiment, the function may include any function associated with the team for implementing a corresponding business event or non-business event. The association relationship may be embodied in multiple aspects. For example, in an implementation, an association display interface of the team may include a control entry for the functions, so that team members can call the corresponding function or enter the control interface of the function, etc., by triggering the control entry; in another implementation, members of the team may have control permissions to the function; for example, when the function is associated with the team, the members of the team may be given control permissions to the function, and for functions unconcerned to the team, the members of the team may not have the corresponding control permissions, thus being unable to control the corresponding functions.

In this embodiment, the team may belong to a preset group, such as an enterprise team belonging to a preset enterprise, and a school team belonging to a preset school. Certainly, the team of the present disclosure is not limited to a team within the group, but may also include other teams in the related technology, such as hobby teams, dating teams, and other teams that are not related to the group.

In this embodiment, update data for the selected function configuration scheme may be received, and functions configured for the team are updated according to the update data to maintain the configuration status of the team up to date. The update data here may be derived from a scheme update operation implemented by a creator of the selected function configuration scheme; for example, when the function configuration scheme is derived from function configuration schemes shared by other teams, if other teams update their functions through the scheme update operation, the functions of the above team may be updated automatically. Certainly, the update operation based on the update data may be automatically executed; or an update prompt maybe sent to the administrator of the above team, and then it is determined to perform the update or ignore the update according to the response of the administrator.

FIG. 6 is a flowchart of a yet another team configuration method according to an example embodiment of the present disclosure. As shown in FIG. 6, the method may be applied to, for example, the server 11 shown in FIG. 1, and may also be applied to, for example, the mobile phone 13 or the PC 14 shown in FIG. 1, and the method may include the following steps.

In step 602, a target function configuration scheme is selected from function configuration schemes associated with a team such that the target function configuration scheme is applied to configure the functions of the team.

In this embodiment, the team may have one or more associated function configuration schemes, and the alternative function configuration schemes may include at least one of: a preset function configuration scheme, and function configuration schemes adopted by other teams. The preset function configuration scheme here may be a predefined function configuration scheme on a server terminal, and all the teams may view and use the preset function configuration scheme at any time. Moreover, by referring to the function configuration schemes adopted by other teams, especially when the other teams or groups to which the other teams belong have a good development state, the function configuration scheme will have greater reference significance and has greater possibility to help the above-mentioned teams to improve the efficiency.

In this embodiment, when the team has multiple associated function configuration schemes, the function configuration scheme adopted by the team may be switched based on a scheme switching instruction. When different function configuration schemes are adopted, they may be applied to different types of environments and scenarios; for example, in an enterprise scenario, different function configuration schemes may be adopted in a working time period and a non-working time period, respectively. For example, the above-mentioned scheme switching instruction may be released by a team administrator to switch the function configuration scheme; or, the server may automatically release a scheme switching instruction according to a switching condition predefined by, for example, the administrator, to automatically switch the function configuration scheme when the switching condition is reached.

In this embodiment, when the team has one or more associated function configuration schemes, the team does not necessarily apply these function configuration schemes; in other words, only the function configuration schemes may be only associated with the team, but not apply them to the team, that is, the team may configure functions without referring to the associated function configuration schemes. Certainly, the function configuration schemes associated to the team may be selected at any time to be applied to the team to configure the functions of the team.

In this embodiment, the function may include any function associated with the team for implementing a corresponding business event or non-business event. The association relationship may be embodied in multiple aspects. For example, in an implementation, an association display interface of the team may include a control entry for the functions, so that team members can call the corresponding function or enter the control interface of the function, etc., by triggering the control entry; in another implementation, members of the team may have control permissions to the function; for example, when the function is associated with the team, the members of the team may be given control permissions to the function, and for functions unconcerned to the team, the members of the team may not have the corresponding control permissions, thus being unable to control the corresponding functions.

In this embodiment, the team may belong to a preset group, such as an enterprise team belonging to a preset enterprise, and a school team belonging to a preset school. Certainly, the team of the present disclosure is not limited to a team within the group, but may also include other teams in the related technology, such as hobby teams, dating teams, and other teams that are not related to the group.

In this embodiment, update data for the selected function configuration scheme may be received, and functions configured for the team are updated according to the update data to maintain the configuration status of the team up to date. The update data here may be derived from a scheme update operation implemented by a creator of the selected function configuration scheme; for example, when the function configuration scheme is derived from function configuration schemes shared by other teams, if other teams update their functions through the scheme update operation, the functions of the above team may be updated automatically. Certainly, the update operation based on the update data may be automatically executed; or an update prompt maybe sent to the administrator of the above team, and then it is determined to perform the update or ignore the update according to the response of the administrator.

For ease of understanding, the technical solution of the present disclosure is described by taking an EIM application as an example. It is assumed that the mobile phone 13 runs an EIM's client terminal, and the server 11 runs an EIM's server terminal; the EIM's client terminal on the mobile phone 13 is logged in with a registered account of User A, and then User A may create a team and configure the functions of the team through the EIM's client terminal running on the mobile phone 13. In the technical solution of the present disclosure, the team may be understood as a group including a plurality of individuals, and may be specifically embodied in various forms, for example, in a form of an enterprise group in the EIM, and group members are group members of the enterprise group.

FIG. 7 is a schematic diagram of a team creation interface 702 according to an example embodiment of the present disclosure. As shown in FIG. 7, the team creation interface 702 may include "Team Name", "Industry", "Enterprise Size", "Region", "Team Member" and other items, which may be used by User A to create a team, i.e., an enterprise group based on the EIM. For example, User A may configure "Team Name" as "Enterprise AA", "Industry" as "catering", "Enterprise Size" as "30-100 persons", "Region" as "Hangzhou", etc., indicating that the "Enterprise AA" is a catering enterprise in Hangzhou and the number of employees is 30-100.

In the embodiment shown in FIG. 7, the EIM may limit the number of "team members" to be greater than or equal to 6. On one hand, it can prevent the enterprise group from being maliciously created and causing waste of resources, and on the other hand, it helps users better experience the team functions of the enterprise group. User A may select a team member from the in-app contacts of the EIM, or select a team member from the local contacts on the mobile phone 13, or select a team member by other means; for example, team members that have not yet registered on the EIM will not be able to log in to the EIM's client terminal, and the EIM's server terminal may help them complete the registration by sending an invitation message to these team members.

After completing the above-mentioned items, User A may implement the team creation operation by triggering an option "Create a team now" shown in FIG. 7 to create an Enterprise group corresponding to the Enterprise AA.

Figure 8:
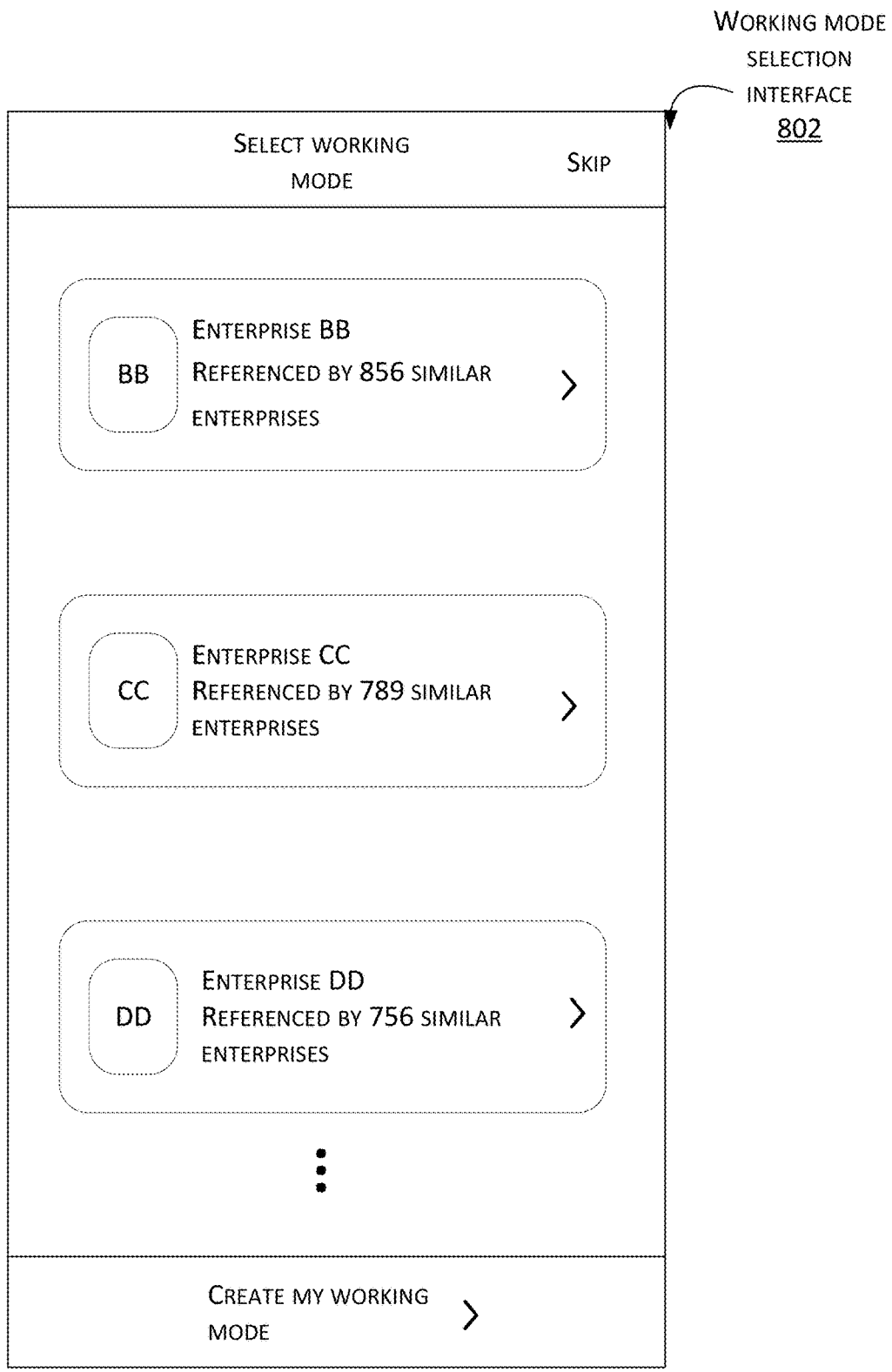
FIG. 8 is a schematic diagram of a working mode selection interface according to an example embodiment of the present disclosure.

FIG. 8 is a schematic diagram of a working mode selection interface 802 according to an example embodiment of the present disclosure. As shown in FIG. 8, the working mode selection interface 802 includes a plurality of alternative working modes, i.e., alternative function configuration schemes in the present disclosure, such as function configuration schemes adopted by Enterprise BB, Enterprise CC, Enterprise DD, and the like. In an embodiment, after User A triggers the option "Create a team now" shown in FIG. 7, the EIM's client terminal may display to User A the working mode selection interface as shown in FIG. 8, so that, after the User A selects a certain alternative working mode, the enterprise group corresponding to the Enterprise AA adopts the selected alternative working mode, that is, the functions of the enterprise group are configured according to the selected alternative working mode.

In the working mode selection interface shown in FIG. 8, the alternative working modes shown may include working modes applicable to the Enterprise AA; in other words, the working modes applicable to the Enterprise AA may be filtered from all working modes, and the filtered working modes are shown in the working mode selection interface as the alternative working modes described above. There may be various sources of the working modes for filtering. For example, one source may be a preset working mode provided by the EIM (for example, provided by the developer of the EIM), and another source may be working modes adopted by other groups, for example, working modes shared by other groups using the working modes (the following is a detailed description of the filtering operation, which will not be described here).

The above filtering operation may be implemented based on the attribute information of the Enterprise AA. For example, because the industry of Enterprise AA is the catering industry, working modes applicable to the catering industry may be selected; for example, Enterprise BB, Enterprise CC, Enterprise DD, etc. are all catering enterprises, so working modes adopted by these enterprises may be provided to the User A as the alternative working modes to be selected. Further, the number of enterprise groups selecting each alternative working mode may be counted, and the alternative working modes are arranged and displayed according to the counting result in the working mode selection interface shown in FIG. 8; for example, the working modes of Enterprise BB are referred to by 856 similar enterprises, the working modes of Enterprise CC are referred to by 789 similar enterprises, and the working modes of Enterprise DD are referred to by 756 similar enterprises; therefore, the working modes of Enterprise BB, Enterprise CC and Enterprise DD are arranged and displayed in sequence according to the number of enterprises referring to the working modes.

In addition to selecting the existing working modes, User A may customize the working mode of the Enterprise AA by triggering an option "Create my working mode" in the working mode selection interface shown in FIG. 8.

Certainly, in some cases, User A may not want to set a working mode for the enterprise group of the Enterprise AA, or may temporarily not be able to determine the working mode that is desired to be selected, then User A may temporarily skip the selection of the working mode and wait for subsequent selection and setting by triggering an option "Skip" in the working mode selection interface 802 shown in FIG. 8.

Figure 9:
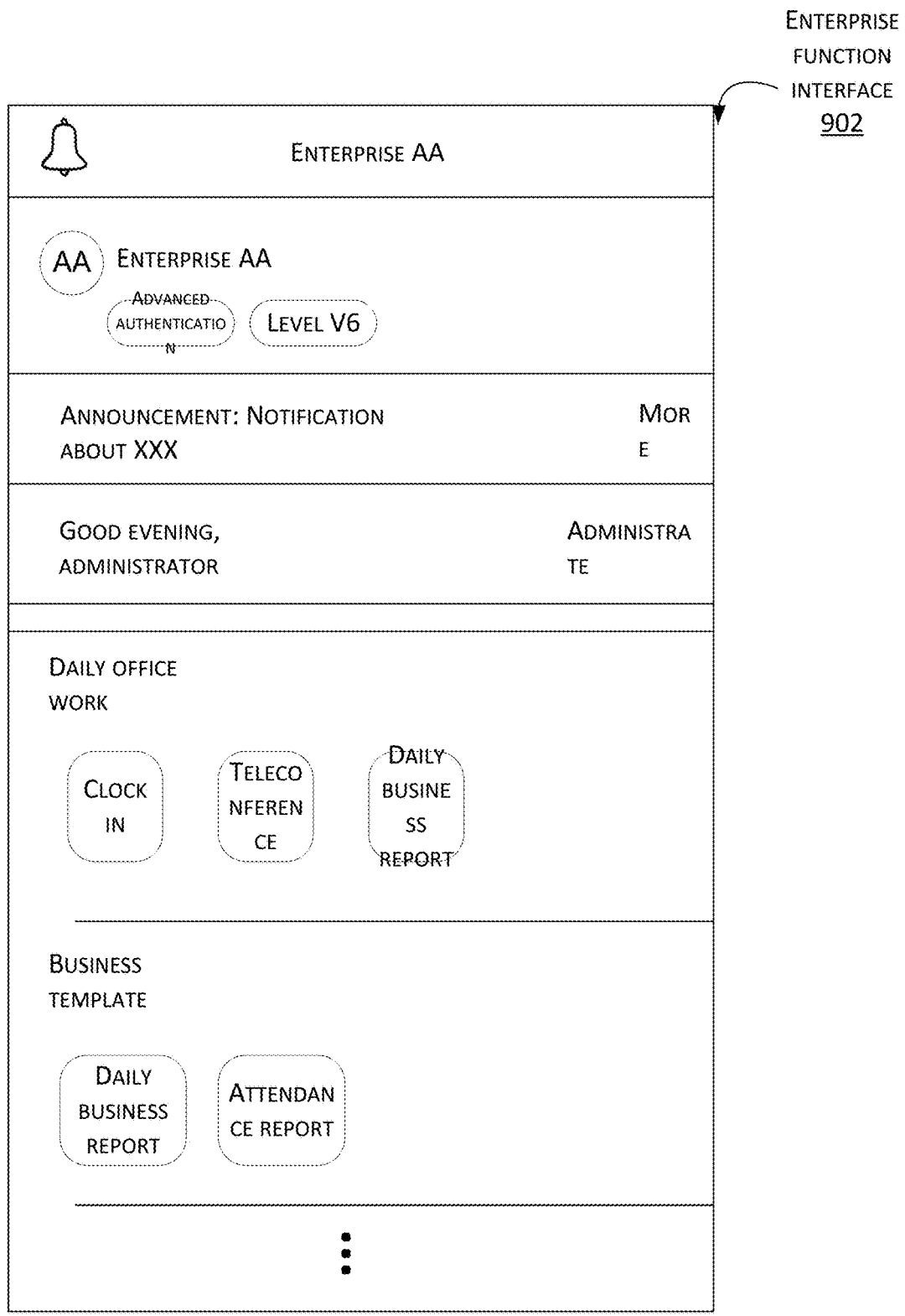
FIG. 9 is a schematic diagram of an enterprise function interface according to an example embodiment of the present disclosure.

FIG. 9 is a schematic diagram of an enterprise function interface 902 according to an example embodiment of the present disclosure. As shown in FIG. 9, it is assumed that User A completes the setting operation of the working mode of the Enterprise AA by selecting an existing working mode or customizing a working mode, and the enterprise function interface 902 may include the functions of the Enterprise AA, for example, functions of "Daily office work" type, such as "Clock in" function, "Teleconference" function, and "Daily business report" function, and for another example, functions of "Business template" type, such as a "Daily business report" template and an "Attendance report" template.

Figure 10:
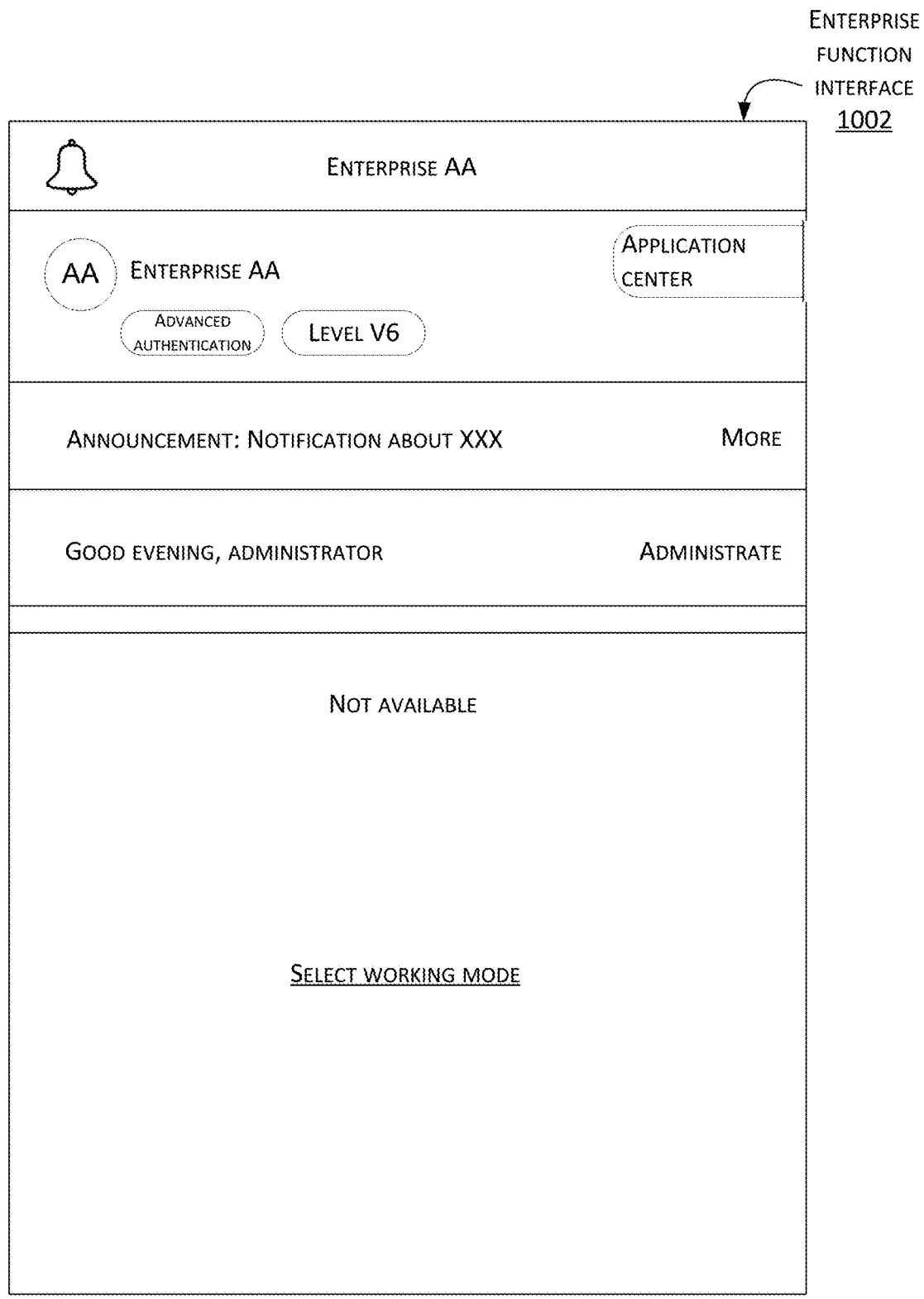
FIG. 10 is a schematic diagram of another enterprise function interface according to an example embodiment of the present disclosure.

In contrast, when User A does not set the working mode of the Enterprise AA, the enterprise function interface 1002 corresponding to the Enterprise AA is as shown in FIG. 10, and the enterprise function interface 1002 does not include the above functions as shown in FIG. 9, which is not favorable for team members to perform related business operations. Certainly, User A can view all the functions provided by the EIM by triggering an option "Application center" shown in FIG. 10, and add them as the functions of the Enterprise AA, which is equivalent to User A manually creating the working mode adopted by the Enterprise AA. Alternatively, by triggering an option "Select a working mode" shown in FIG. 10, User A turns to the working mode selection interface shown in FIG. 8 to browse and select the alternative working mode without viewing the functions in the "Application center" one by one.

Figure 11:
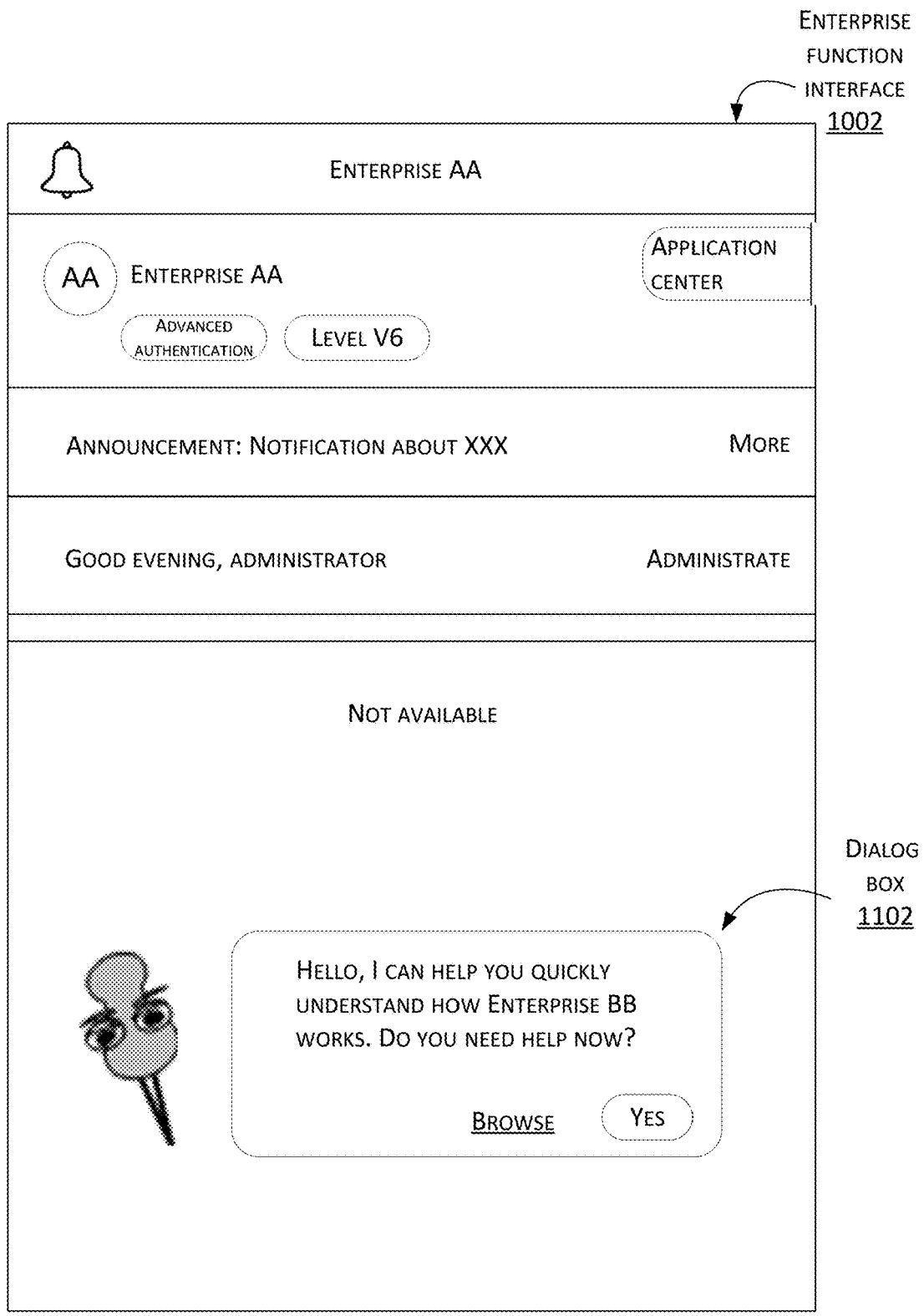
FIG. 11 is a schematic diagram of a yet another enterprise function interface according to an example embodiment of the present disclosure.

In addition, when User A does not set the working mode of the Enterprise AA, the EIM may also actively recommend the working modes applicable to the Enterprise AA, and the user A does not need to trigger the option "Select a working mode" shown in FIG. 10. In an embodiment, the form of the active recommendation may include: providing a smart customer service by the EIM, the smart customer service may display a dialog box 1102 as shown in FIG. 11 at the enterprise function interface 1002 of the Enterprise AA, and recommend the working mode of Enterprise BB to User A with prompt information such as "Hello, I can help you quickly understand how Enterprise BB works. Do you need help now?". Then, when User A triggers an option "Help", the working mode of Enterprise BB may be viewed and applied, and when User A triggers an option "Browse", User A may turn to the working mode selection interface as shown in FIG. 8 to view more alternative working modes.

Certainly, even if User A has already set the working mode of the Enterprise AA, the above-described smart customer service may still provide the prompt information to User A, to optimize the working mode of the Enterprise AA.

Figure 12:
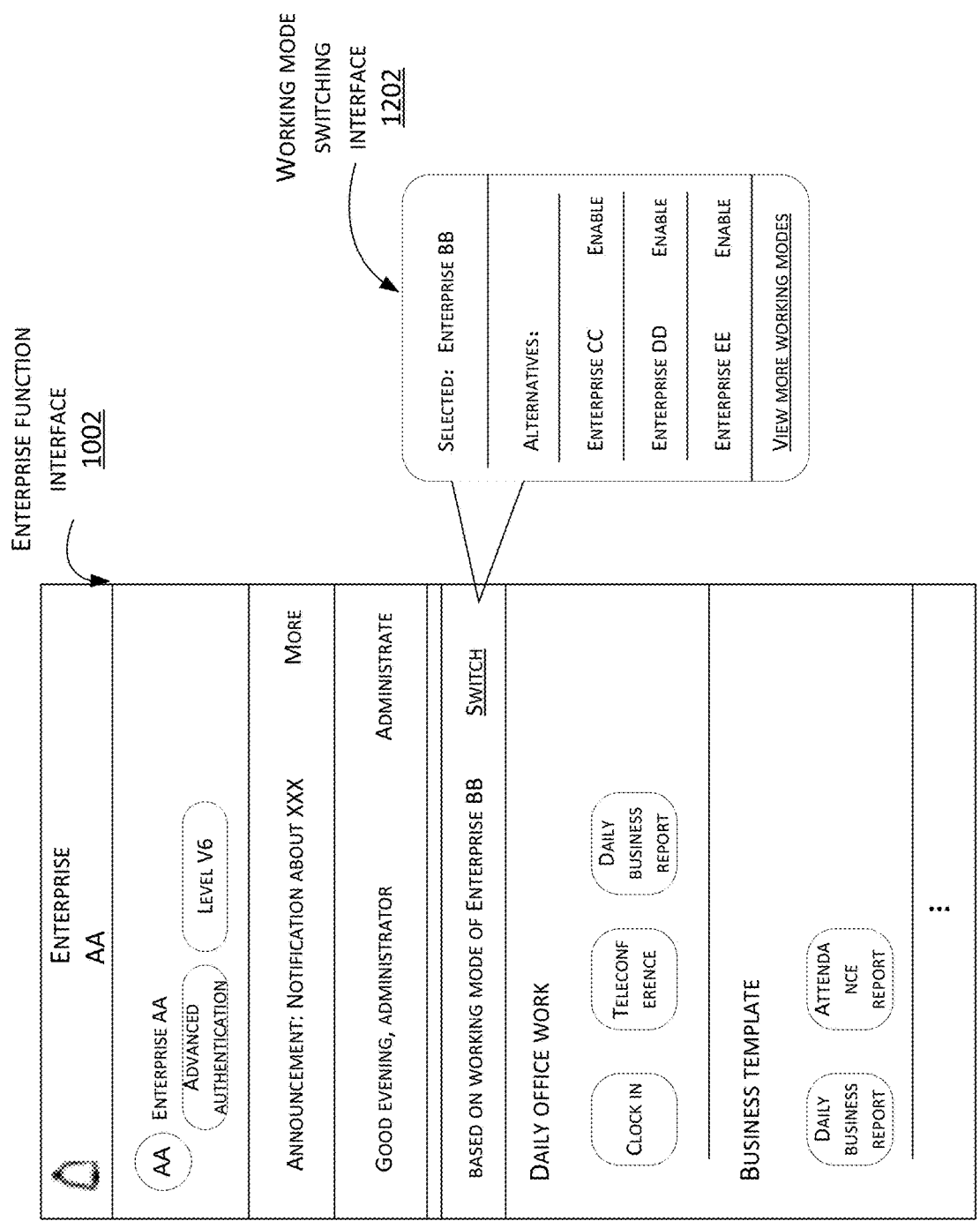
FIG. 12 is a schematic diagram of a yet another enterprise function interface according to an example embodiment of the present disclosure.

User A may set one or more associated working modes for the Enterprise AA and select, from these associated working modes, a working mode desired to be applied to the Enterprise AA. For example, as shown in FIG. 12, when the User A selects the working mode of the Enterprise BB, the enterprise function interface of the Enterprise AA may show the corresponding functions; for example, in the enterprise function interface, prompt information, such as "based on the working mode of Enterprise BB", may also be shown to indicate that the working mode of Enterprise BB is adopted currently.

The working mode selected by Enterprise AA may be switched between the multiple working modes associated with Enterprise AA. For example, as shown in FIG. 12, when User A triggers an option "Switch" in the enterprise function interface 1002, the EIM's client terminal may display a corresponding working mode switching interface 1202, and the working mode switching interface displays all the working modes associated with Enterprise AA, including the selected working mode of Enterprise BB, and working modes of Enterprise CC, Enterprise DD, Enterprise EE, etc., as alternative working modes; when User A triggers an option "Enable" corresponding to Enterprise CC, Enterprise DD, or Enterprise EE, for example, triggers the option "Enable" corresponding to Enterprise CC, the working mode applied by Enterprise AA is then switched from the working mode of Enterprise BB to the working mode of Enterprise CC.

As described above, in the technical solution of the present disclosure, the function configuration schemes adopted may be shared among teams. The sharing process of the team configuration schemes is described below.

Figure 13:
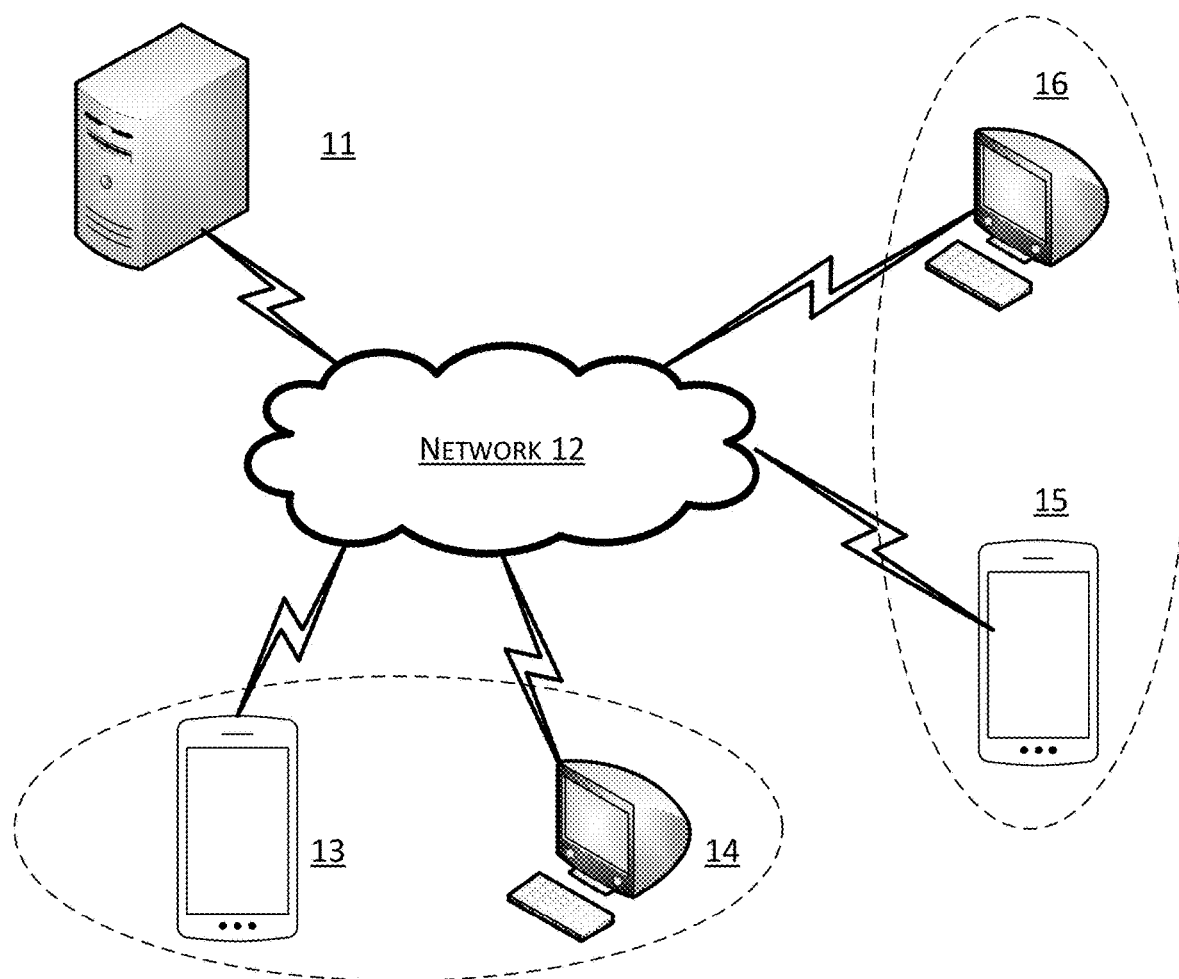
FIG. 13 is a schematic architecture diagram of a system for sharing a team configuration scheme according to an example embodiment of the present disclosure.

FIG. 13 is a schematic architecture diagram of a system for sharing a team configuration scheme according to an example embodiment of the present disclosure. As shown in FIG. 13, the system may include several electronic devices such as a mobile phone 15 and a PC 16 in addition to the server 11, the network 12, and the mobile phone 13 and the PC 14 as shown in FIG. 1.

Similar to the mobile phone 13 and the PC 14, the mobile phone 15 and the PC 16 are just one type of electronic devices that may be used by users. In fact, users apparently may also use such electronic devices as tablet devices, notebook computers, PDAs (Personal Digital Assistants), wearable devices (such as smart glasses and smart watches), etc., which is not limited by the present disclosure. During operation, the electronic devices, such as the mobile phone 13 and the PC 14, as well as the mobile phone 15 and the PC 16, may run a client-side program of an application to implement related functions of the application, for example, to implement client terminals of the mobile group office platform.

Then, when the mobile phone 13 or the PC 14 corresponds to the first team and the mobile phone 15 or the PC 16 corresponds to the second team, the team configuration scheme of the first team may be shared to the second team, or the team configuration scheme of the second team may be shared to the first team. The sharing process will be described in detail below in conjunction with the embodiments.

Figure 14A:
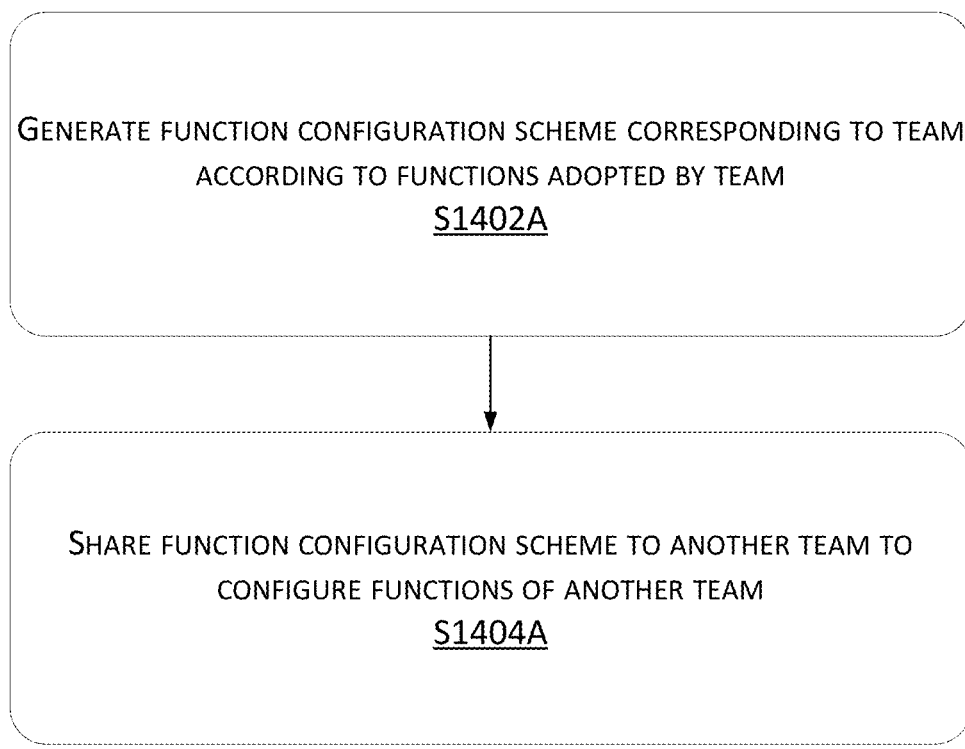
FIG. 14A is a flowchart of a method for sharing a team configuration scheme according to an example embodiment of the present disclosure.

FIG. 14A is a flowchart of a method for sharing a team configuration scheme according to an example embodiment of the present disclosure. As shown in FIG. 14A, the method may be applied to, for example, the server 11 shown in FIG. 13, and may also be applied to, for example, the mobile phone 13 and the PC 14 or the mobile phone 15 and the PC 16 shown in FIG. 13, and the method may include the following steps.

In step 1402A, a function configuration scheme corresponding to a team is generated according to functions adopted by the team.

In step 1404A, the function configuration scheme is shared to another team to configure the functions of the another team.

In this embodiment, the function configuration scheme may be sent to the other team; alternatively, the function configuration scheme may be shared to a shared platform such that the function configuration scheme is pushed by the shared platform to the other team; alternatively, the function configuration scheme may be shared to the shared platform, wherein the other team has an access permission to the shared platform. Certainly, the function configuration scheme may also be shared by other means, which is not limited by the present disclosure.

In this embodiment, when the function configuration scheme is updated, update data may be sent to the other team; wherein, when the other team adopts the function configuration scheme, the update data is used for updating the functions configured for the other team.

Figure 14B:
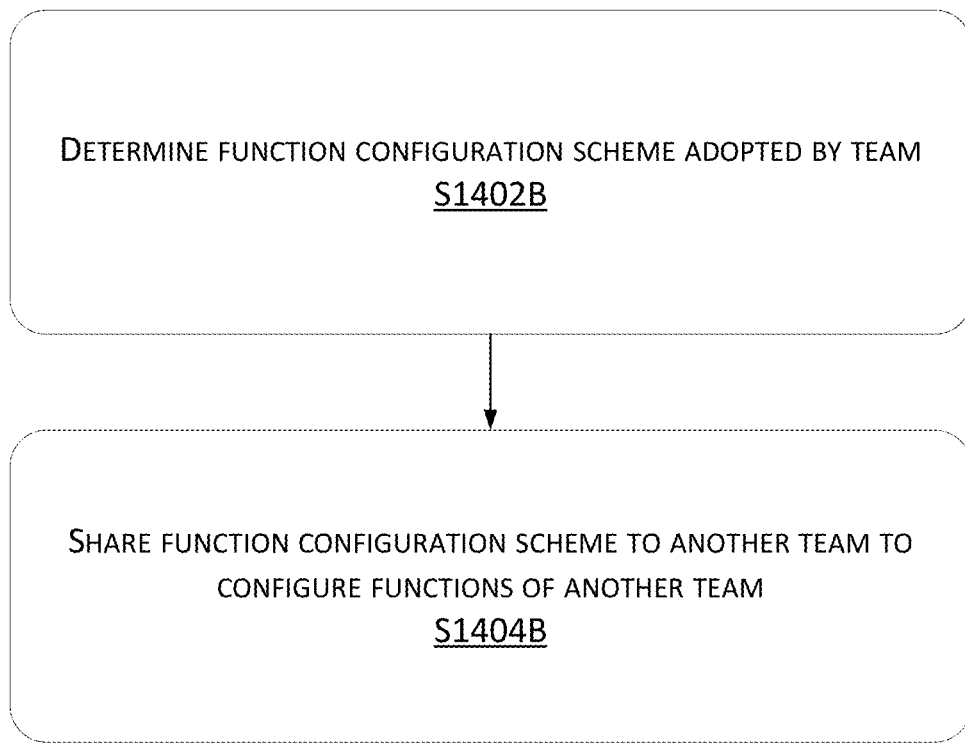
FIG. 14B is a flowchart of another method for sharing a team configuration scheme according to an example embodiment of the present disclosure.

FIG. 14B is a flowchart of another method for sharing a team configuration scheme according to an example embodiment of the present disclosure. As shown in FIG. 14B, the method may be applied to, for example, the server 11 shown in FIG. 13, and may also be applied to, for example, the mobile phone 15 or the PC 16 shown in FIG. 13, and the method may include the following steps.

In step 1402B, a function configuration scheme adopted by a team is determined.

In step 1404B, the function configuration scheme is shared to another team to configure the functions of the another team.

In this embodiment, the function configuration scheme may be sent to the other team; alternatively, the function configuration scheme may be shared to a shared platform such that the function configuration scheme is pushed by the shared platform to the other team; alternatively, the function configuration scheme may be shared to the shared platform, wherein the other team has an access permission to the shared platform. Certainly, the function configuration scheme may also be shared by other means, which is not limited by the present disclosure.

In this embodiment, when the function configuration scheme is updated, update data may be sent to the other team; wherein, when the other team adopts the function configuration scheme, the update data is used for updating the functions configured for the other team. For example, the update data may be sent to a shared platform and pushed to another team by the shared platform, or the shared platform is accessed by another team with an access permission to obtain the updated data.

FIG. 15A is a flowchart of a yet another method for sharing a team configuration scheme according to an example embodiment of the present disclosure. As shown in FIG. 15A, the method may be applied to, for example, the server 11 shown in FIG. 13, and may also be applied to, for example, the mobile phone 15 or the PC 16 shown in FIG. 13, and the method may include the following steps.

In step 1502A, a function configuration scheme corresponding to a team is generated according to functions adopted by the team.

In step 1504A, the function configuration scheme is shared to a shared platform such that the function configuration scheme is pushed by the shared platform to another team to configure the functions of the another team; or the function configuration scheme is shared to the shared platform to configure the functions of the other team, wherein the other team has an access permission to the shared platform.

In this embodiment, when the function configuration scheme is updated, update data may be sent to the other team; wherein, when the other team adopts the function configuration scheme, the update data is used for updating the functions configured for the other team. For example, the update data may be sent to a shared platform and pushed to another team by the shared platform, or the shared platform is accessed by another team with an access permission to obtain the updated data.

FIG. 15B is a flowchart of a yet another method for sharing a team configuration scheme according to an example embodiment of the present disclosure. As shown in FIG. 15B, the method may be applied to, for example, the server 11 shown in FIG. 13, and may also be applied to, for example, the mobile phone 15 or the PC 16 shown in FIG. 13, and the method may include the following steps.

In step 1502B, a function configuration scheme adopted by a team is determined.

In step 1504B, the function configuration scheme is shared to a shared platform such that the function configuration scheme is pushed by the shared platform to another team to configure the functions of the another team; or the function configuration scheme is shared to the shared platform to configure the functions of the another team, wherein the another team has an access permission to the shared platform.

In this embodiment, when the function configuration scheme is updated, update data may be sent to the other team; wherein, when the other team adopts the function configuration scheme, the update data is used for updating the functions configured for the other team. For example, the update data may be sent to a shared platform and pushed to another team by the shared platform, or the shared platform is accessed by another team with an access permission to obtain the updated data.

Figure 16:
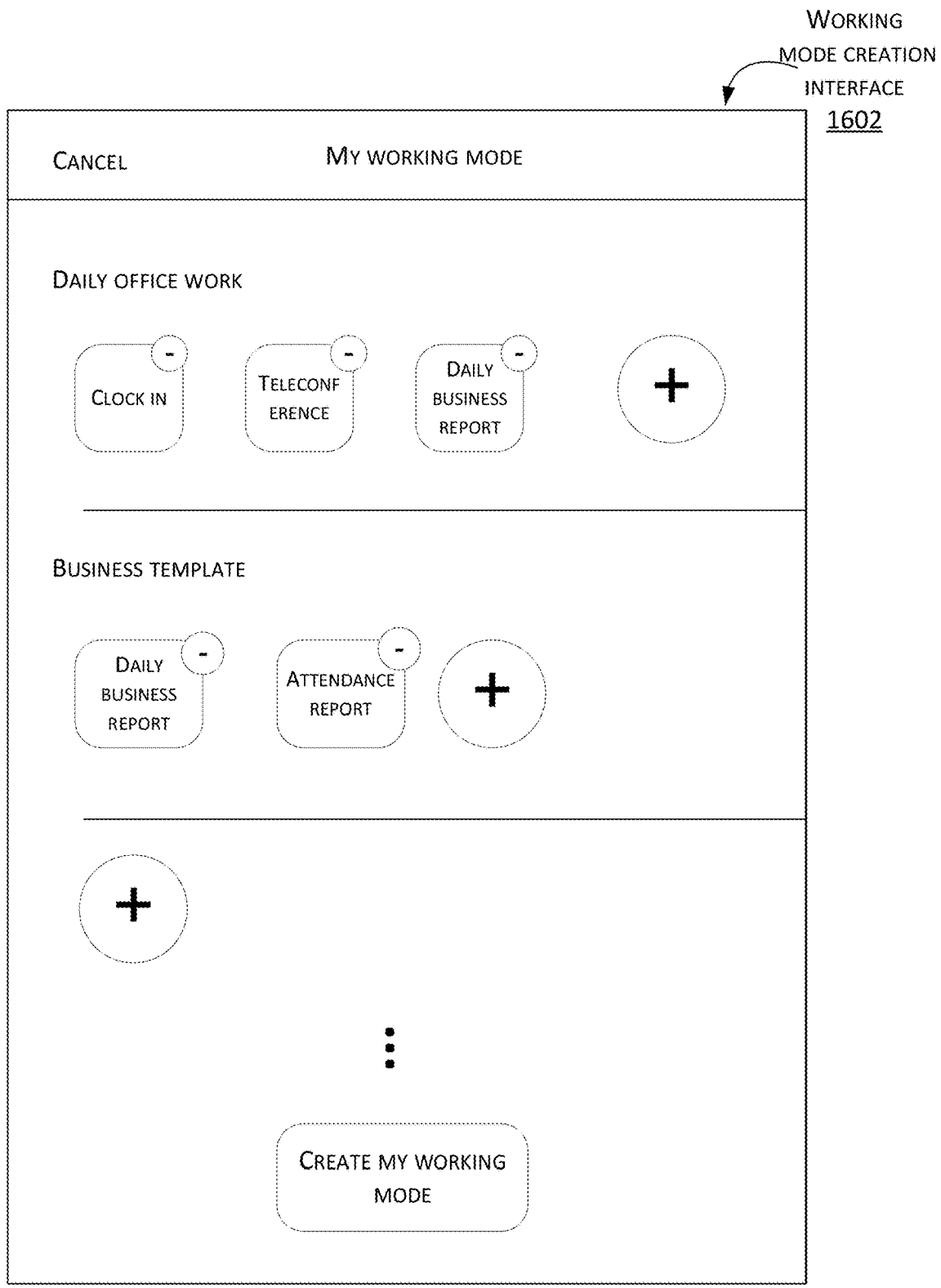
FIG. 16 is a schematic diagram of a working mode creation interface according to an example embodiment of the present disclosure.

FIG. 16 is a schematic diagram of a working mode creation interface 1602 according to an example embodiment of the present disclosure. It is assumed that User A in the above embodiment turns to the working mode creation interface as shown in FIG. 16 by triggering an option "Create my working mode" shown in FIG. 8, and selects functions applied to Enterprise AA; User A may create a customized working mode by triggering the option "Create my working mode" in the working mode creation interface.

Figure 17:
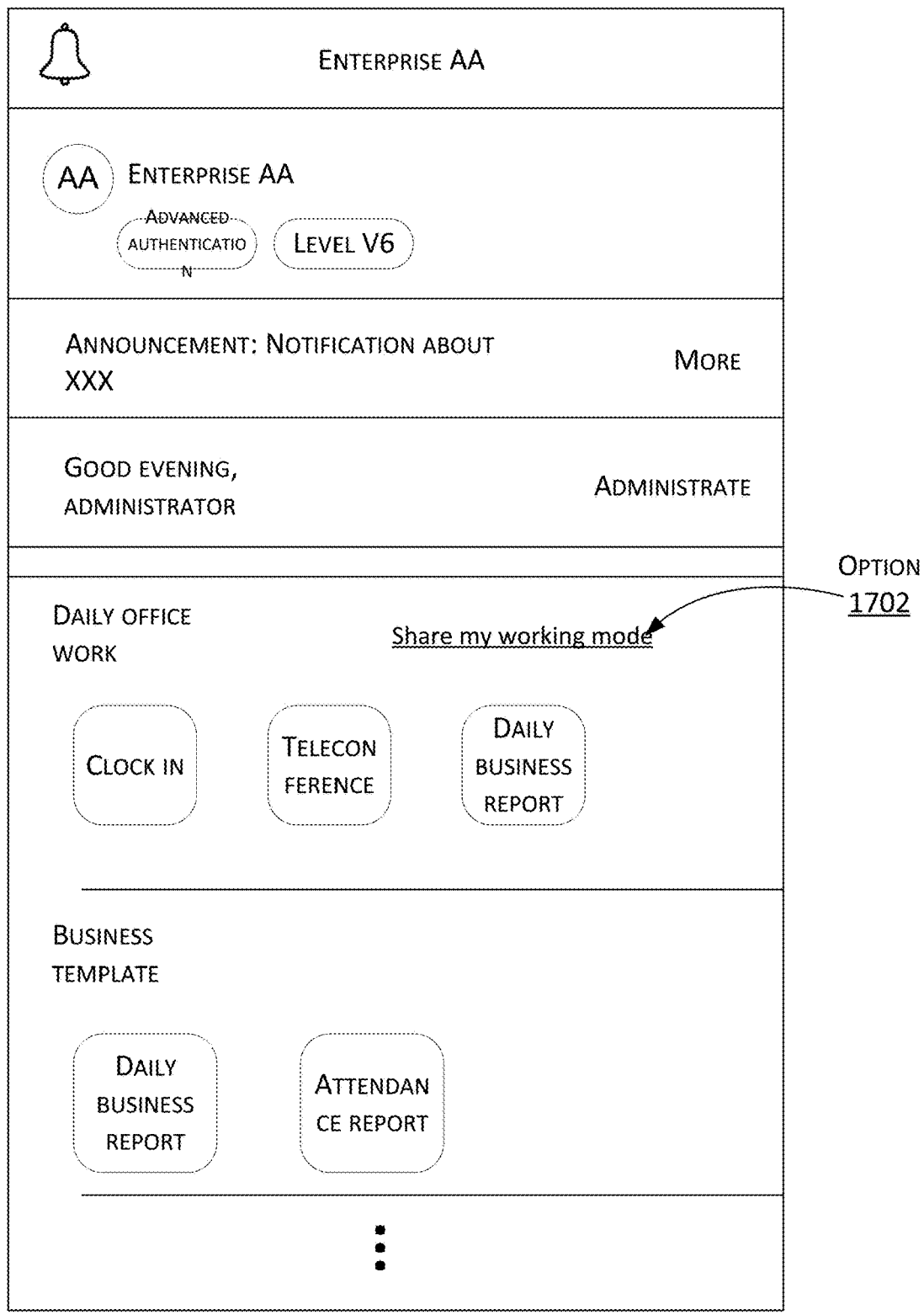
FIG. 17 is a schematic diagram of a yet another enterprise function interface according to an example embodiment of the present disclosure.

When Enterprise AA applies a working mode customized by User A, an option 1702, such as "Share my working mode", may be displayed in the enterprise function interface as shown in FIG. 17, so that User A can share the above customized working mode by triggering the option. For example, the customized working mode may be directly shared with other teams; or, the customized working mode may be shared to the EIM (equivalent to a shared platform) for viewing and use by other teams of the EIM; or the customized working mode may be actively recommended by the EIM to other teams.

Figure 18:
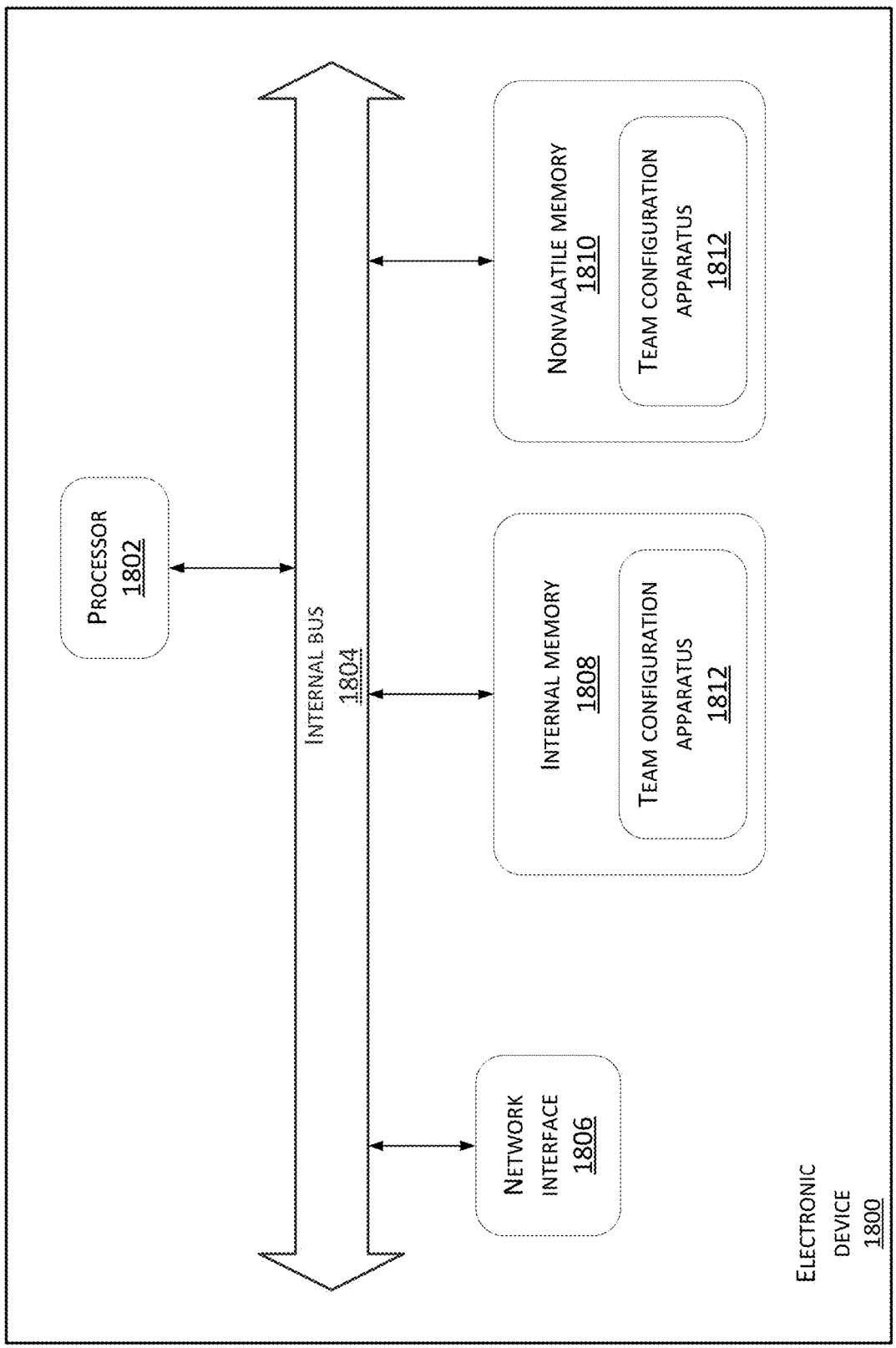
FIG. 18 shows a schematic structural diagram of an electronic device according to an example embodiment of the present disclosure.

FIG. 18 shows a schematic structural diagram of a device or an electronic device 1800 according to an example embodiment of the present disclosure. Referring to FIG. 18, at the hardware level, the electronic device includes a processor 1802, an internal bus 1804, a network interface 1806, an internal memory 1808, and a non-volatile memory 1810, and certainly may also include hardware required for other services. The processor 1802 reads a corresponding computer program from the non-volatile memory 1810 into the internal memory 1808 and then operates, thus forming a team configuration apparatus 1812 at a logical level. Certainly, in addition to software implementations, the present disclosure does not exclude other implementations, such as a logic device or an implementation combining software and hardware, etc.; in other words, the execution subject of the following processing flow is not limited to each logical unit, and it also may be hardware or a logic device. Both the internal memory 1808 and the non-volatile memory 1810 are examples of computer readable media.

Figure 19:
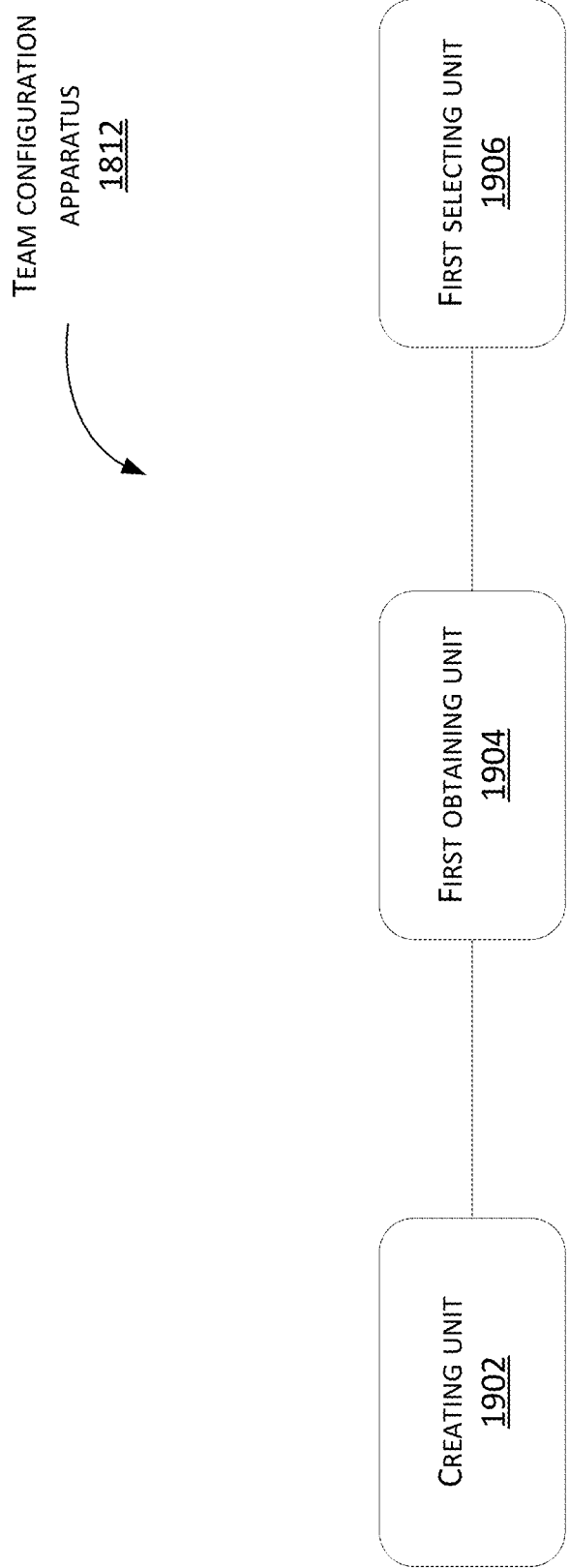
FIG. 19 is a block diagram of a team configuration apparatus according to an example embodiment of the present disclosure.

Referring to FIG. 19, in some implementations, the team configuration apparatus 1812 may include:

a creating unit 1902, configured to create a team according to a received team creation instruction;

a first obtaining unit 1904, configured to obtain alternative function configuration schemes applicable to the team; and a first selecting unit 1906, configured to select at least one function configuration scheme from the alternative function configuration schemes such that the selected function configuration scheme is applied to configure the functions of the team.

Figure 20:
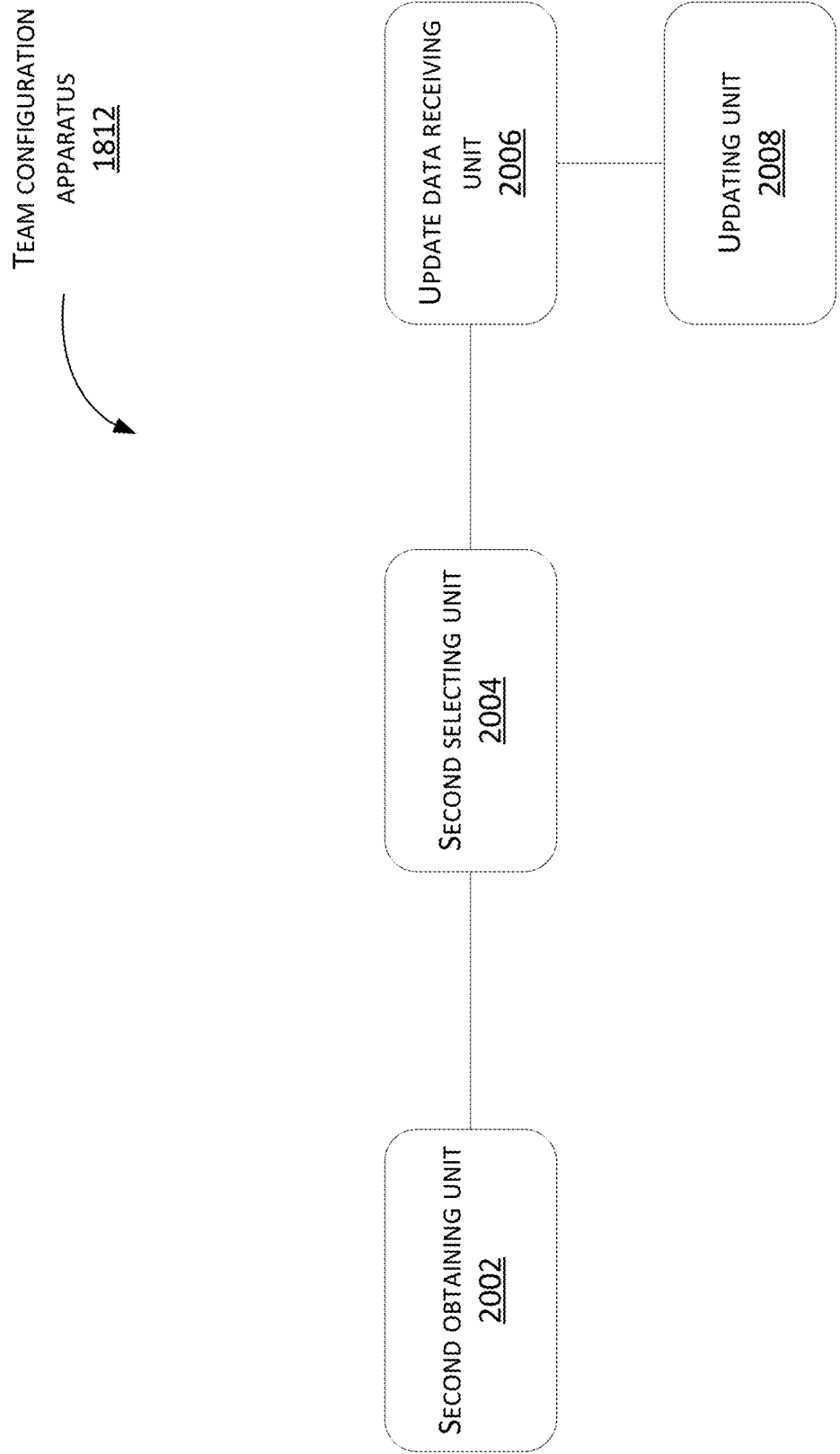
FIG. 20 is another block diagram of a team configuration apparatus according to an example embodiment of the present disclosure.

Referring to FIG. 20, in some implementations, the team configuration apparatus 1812 may include:

a second obtaining unit 2002, configured to obtain alternative function configuration schemes applicable to a team; and a second selecting unit 2004, configured to select at least one function configuration scheme from the alternative function configuration schemes such that the selected function configuration scheme is applied to configure the functions of the team.

For example, the second determining unit 2002 is specifically configured to determine a team type to which the team belongs according to attribute information of the team; and obtain function configuration schemes corresponding to the team type as the alternative function configuration schemes.

For example, the attribute information includes at least one of:

geographical location information, the number of members, team affiliation information, and industry affiliation information.

For example, the alternative function configuration schemes include at least one of:

a preset function configuration scheme, and function configuration schemes adopted by other teams.

For example, an associated display interface of the team includes a control entry for the functions.

For example, members of the team have control permissions to the functions.

For example, the team configuration apparatus 1812 further includes:

an update data receiving unit 2006, configured to receive update data for the selected function configuration scheme; and an updating unit 2008, configured to update the functions configured for the team according to the update data.

For example, the update data is derived from a scheme update operation implemented by a creator of the selected function configuration scheme.

Figure 21:
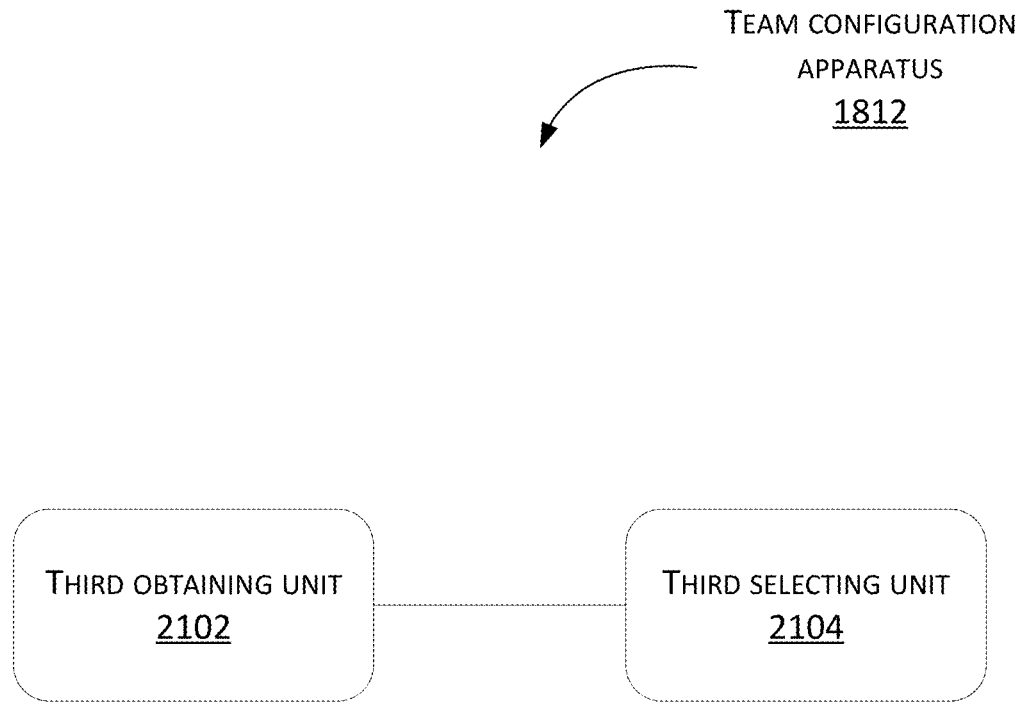
FIG. 21 is a yet another block diagram of a team configuration apparatus according to an example embodiment of the present disclosure.

Referring to FIG. 21, in some implementations, the team configuration apparatus 1812 may include:

a third obtaining unit 2102, configured to obtain alternative configuration schemes applicable to a team; and a third selecting unit 2104, configured to select at least one configuration scheme from the alternative configuration schemes such that the selected configuration scheme is applied to configure the team.

Figure 22:
FIG. 22 is a yet another block diagram of a team configuration apparatus according to an example embodiment of the present disclosure.

Referring to FIG. 22, in some implementations, the team configuration apparatus 1812 may include:

a switching instruction receiving unit 2202, configured to receive a scheme switching instruction for a team; and a switching unit 2204, configured to determine, from function configuration schemes associated with the team, a target function configuration scheme indicated by the scheme switching instruction such that the target function configuration scheme is applied to configure the functions of the team.

Referring to FIG. 23, in some implementations, the team configuration apparatus 1812 may include:

a fourth selecting unit 2302, configured to select a target function configuration scheme from function configuration schemes associated with a team such that the target function configuration scheme is applied to configure the functions of the team.

Figure 24:
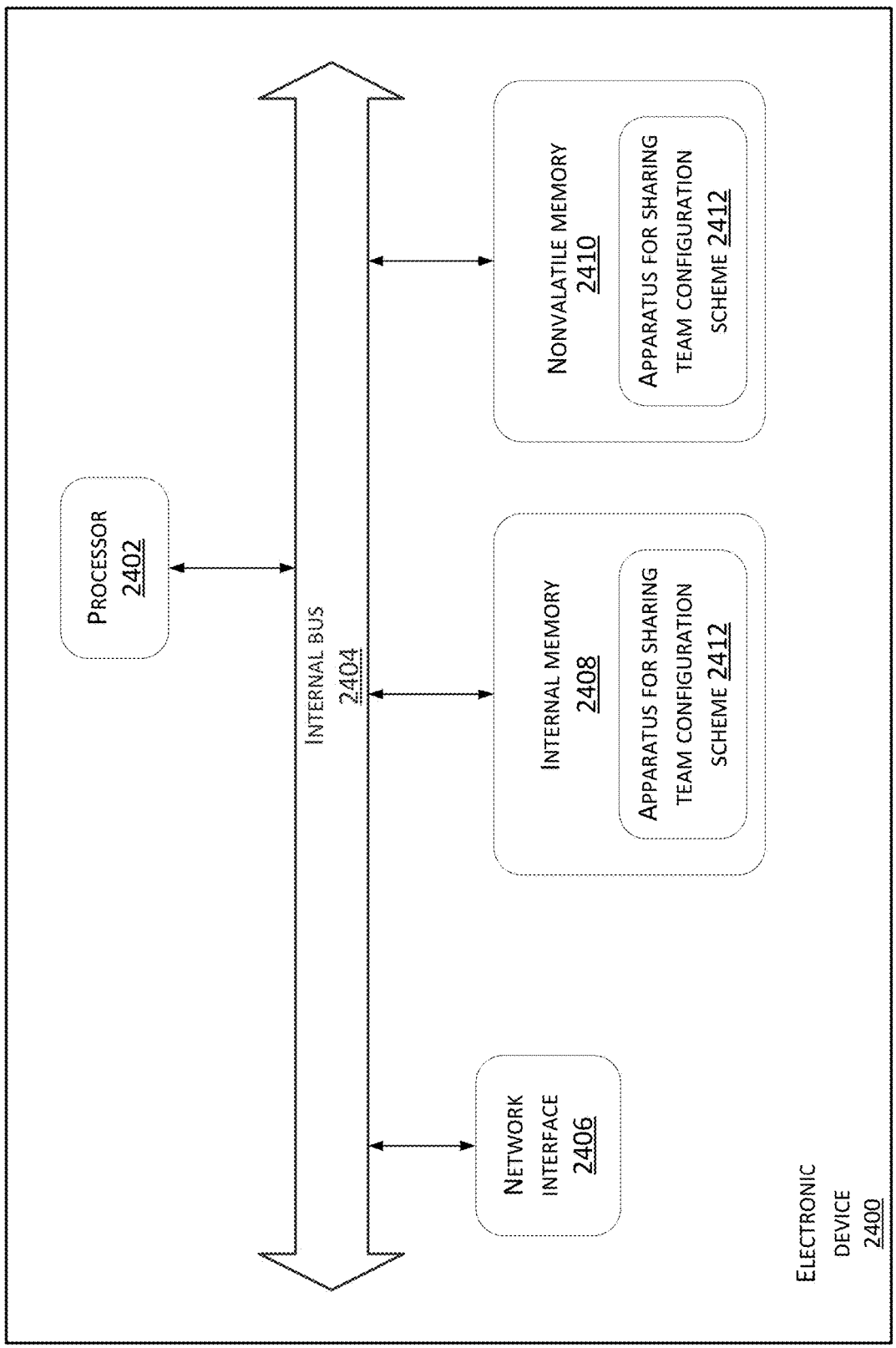
FIG. 24 shows a schematic structural diagram of another electronic device according to an example embodiment of the present disclosure.

FIG. 24 shows a schematic structural diagram of a device or an electronic device according to an example embodiment of the present disclosure. Referring to FIG. 24, at the hardware level, the electronic device includes a processor 2402, an internal bus 2404, a network interface 2406, a memory 2408, and a non-volatile memory 2410, and certainly may also include hardware required for other services. The processor 2402 reads a corresponding computer program from the non-volatile memory 2410 into the memory 2408 and then operates, thus forming an apparatus for sharing a team configuration scheme 2412 at a logical level. Certainly, in addition to software implementations, the present disclosure does not exclude other implementations, such as a logic device or an implementation combining software and hardware, etc.; in other words, the execution subject of the following processing flow is not limited to each logical unit, and it also may be hardware or a logic device. Both the internal memory 2408 and the non-volatile memory 2410 are examples of computer readable media.

Figure 25:
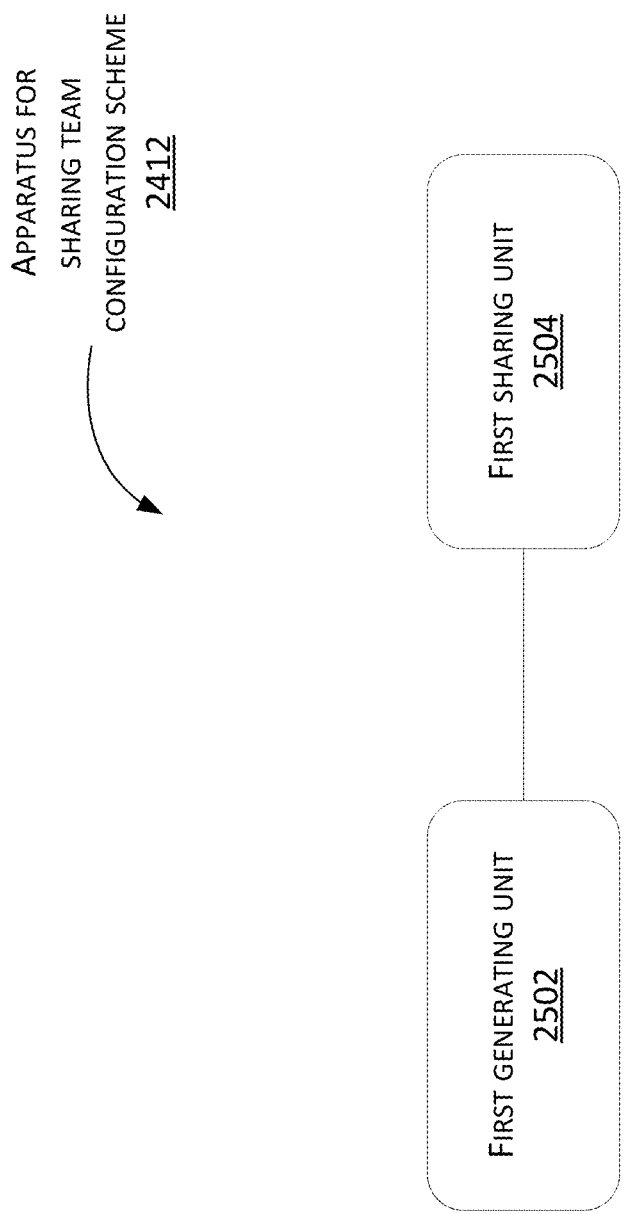
FIG. 25 is a block diagram of an apparatus for sharing a team configuration scheme according to an example embodiment of the present disclosure.

Referring to FIG. 25, in some implementations, the apparatus for sharing a team configuration scheme 2412 may include:

a first generating unit 2502, configured to generate a function configuration scheme corresponding to a team according to functions adopted by the team; and a first sharing unit 2504, configured to share the function configuration scheme to another team to configure the functions of the other team.

Figure 26:
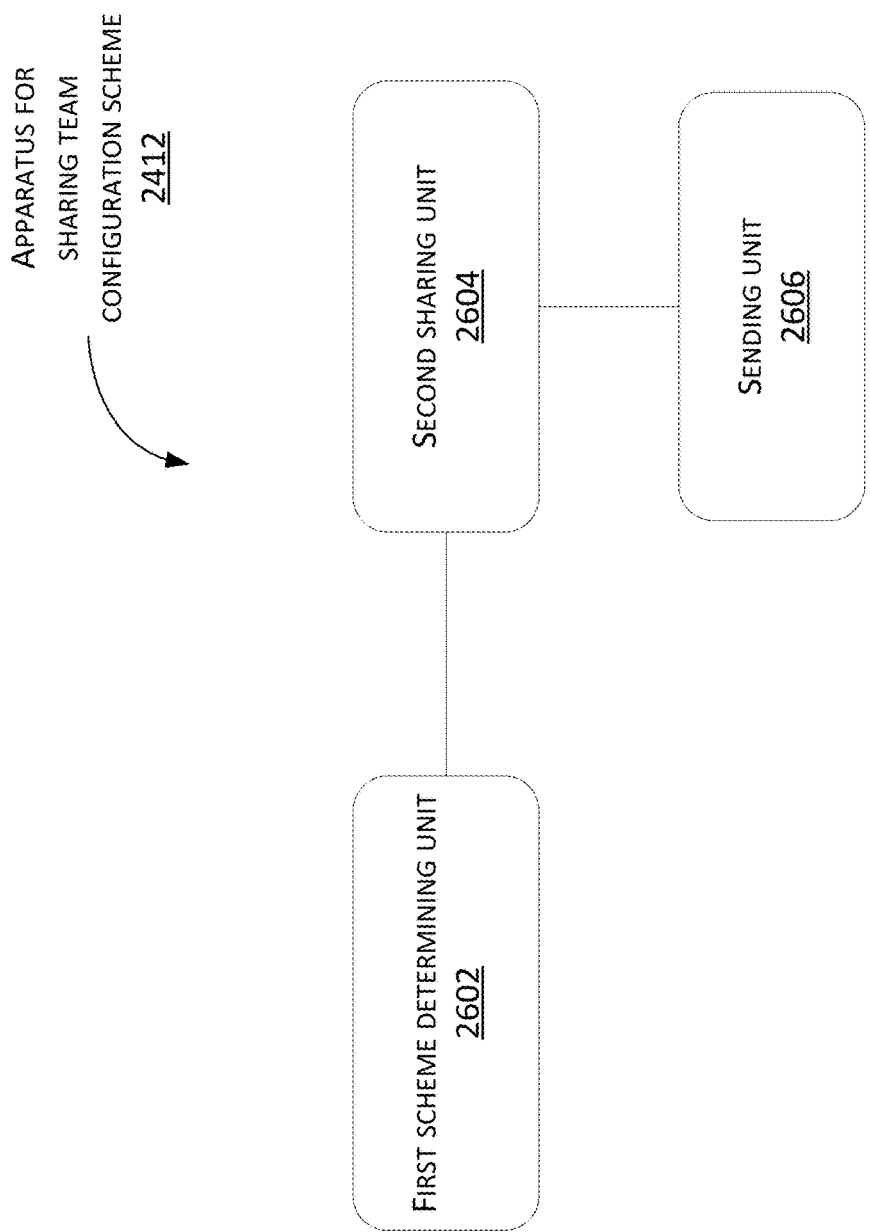
FIG. 26 is another block diagram of an apparatus for sharing a team configuration scheme according to an example embodiment of the present disclosure.

Referring to FIG. 26, in some implementations, the apparatus for sharing a team configuration scheme 2412 may include:

a first scheme determining unit 2602, configured to determine a function configuration scheme adopted by a team; and a second sharing unit 2604, configured to share the function configuration scheme to another team to configure the functions of the other team.

For example, the second sharing unit 2604 is specifically configured to send the function configuration scheme to the other team; or share the function configuration scheme to a shared platform such that the function configuration scheme is pushed by the shared platform to the other team; or share the function configuration scheme to the shared platform, wherein the other team has an access permission to the shared platform.

For example, the apparatus for sharing a team configuration scheme 2412 further includes:

a sending unit 2606, configured to send update data to the other team when the function configuration scheme is updated;

wherein, when the other team adopts the function configuration scheme, the update data is used for updating the functions configured for the other team.

Figure 27:
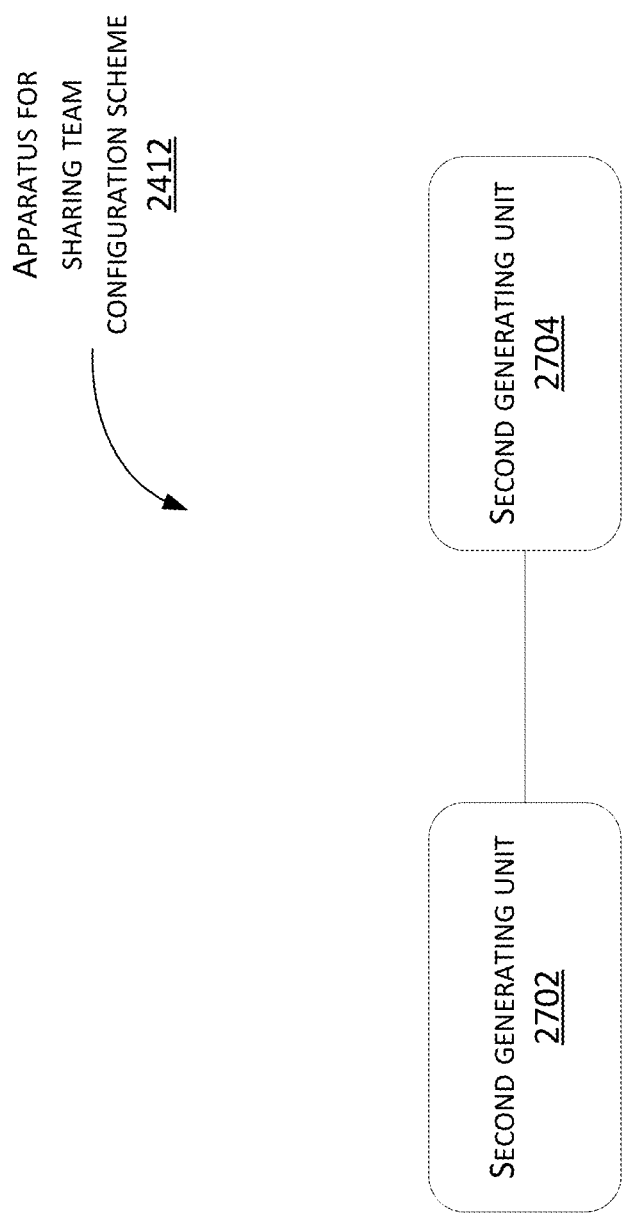
FIG. 27 is a yet another block diagram of an apparatus for sharing a team configuration scheme according to an example embodiment of the present disclosure.

Referring to FIG. 27, in some implementations, the apparatus for sharing a team configuration scheme 2412 may include:

a second generating unit 2702, configured to generate a function configuration scheme corresponding to a team according to functions adopted by the team; and a third sharing unit 2704, configured to share the function configuration scheme to a shared platform such that the function configuration scheme is pushed by the shared platform to another team to configure the functions of the other team; or share the function configuration scheme to the shared platform to configure the functions of the other team, wherein the other team has an access permission to the shared platform.

Figure 28:
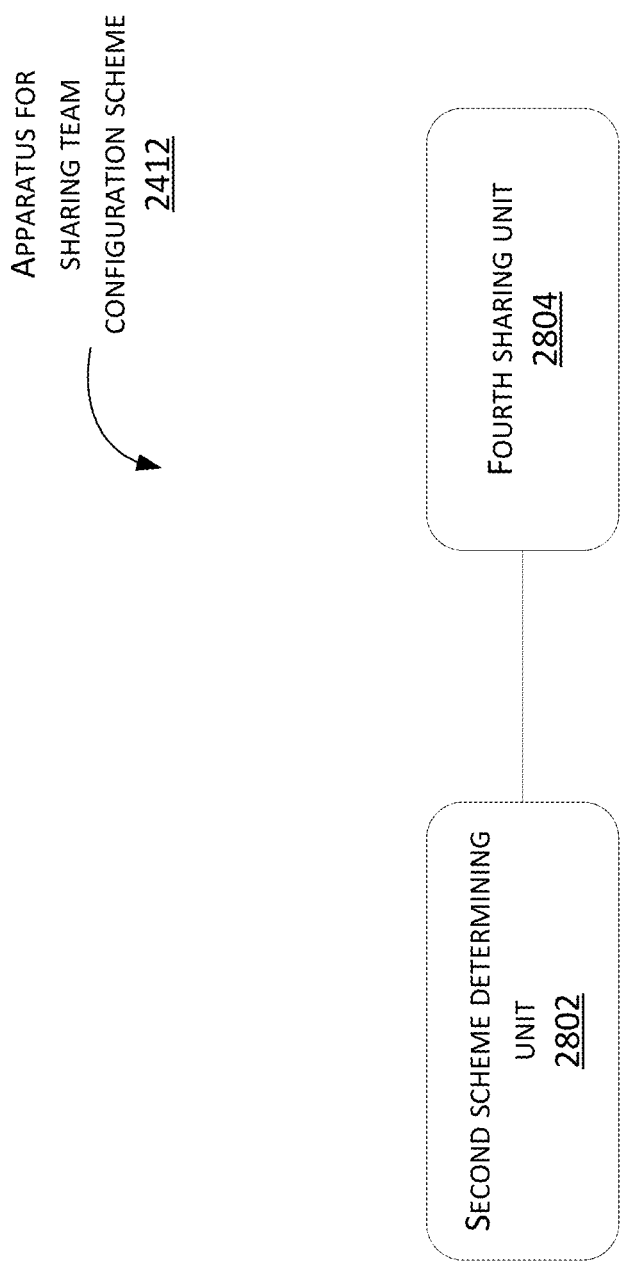
FIG. 28 is a yet another block diagram of an apparatus for sharing a team configuration scheme according to an example embodiment of the present disclosure.

Referring to FIG. 28, in some implementations, the apparatus for sharing a team configuration scheme 2412 may include:

a second scheme determining unit 2802, configured to determine a function configuration scheme adopted by a team; and a fourth sharing unit 2804, configured to share the function configuration scheme to a shared platform such that the function configuration scheme is pushed by the shared platform to another team to configure the functions of the other team; or share the function configuration scheme to the shared platform to configure the functions of the other team, wherein the other team has an access permission to the shared platform.

The systems, apparatuses, modules or units illustrated in the above embodiments may specifically be implemented by a computer chip or an entity, or by a product having a certain function. A typical implementing device is a computer, and the computer may be in a specific form of a personal computer, a laptop computer, a cellular phone, a camera phone, a smart phone, a personal digital assistant, a media player, a navigation device, an email device, a game console, a tablet computer, a wearable device or a combination of any of these devices.

In a typical configuration, the computer includes one or more processors (CPUs), input/output interfaces, network interfaces, and a memory.

The memory may be in a form of a non-permanent memory, a random access memory (RAM), and/or a non-volatile memory, such as a read-only memory (ROM) or a flash RAM, in computer-readable media. The memory is an example of computer-readable media.

Computer readable media include both permanent and non-permanent, removable and non-removable media and may store information by any method or technology. The information may be a computer readable instruction, a data structure, a module of a program or other data. Examples of computer storage media include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a tape cassette, a magnetic tape/magnetic disk storage or other magnetic storage devices or any other non-transmission medium, and may be used for storing information accessible by computing devices. As defined herein, the computer readable media do not include transitory media, such as modulated data signals and carriers.

It should be further noted that the term "include", "comprise" or any other variations thereof are intended to cover non-exclusive inclusions such that a process, a method, an article, or a device that includes a series of elements not only includes those elements but also includes other elements that are not listed explicitly, or also include inherent elements of the process, the method, the article, or the device. In the absence of more limitations, an element defined by the sentence "including a/an . . . " does not exclude that the process, the method, the article or the device including the element further has other identical elements.

The terminology used in the present disclosure is for the purpose of describing specific embodiments, but not intended to limit the present disclosure. The singular forms "a", "said" and "the" as used in the present disclosure and the appended claims are also intended to include plural forms unless otherwise other meanings are explicitly indicated in the context. It also should be understood that the term "and/or" as used herein refers to encompassing any or all possible combinations of one or more associated listed items.

It should be understood that although the terms "first", "second", "third", etc. may be used in the present disclosure to describe various types of information, such information should not be limited to these terms. These terms are only used to distinguish the same type of information from each other. For example, first information may also be referred to as second information without departing from the scope of the present disclosure. Similarly, the second information may also be referred to as the first information. It depends on the context; for example, the word "if" as used herein may be interpreted as "at the time of" or "when" or "in response to a determination".

The above description is merely example embodiments of the present disclosure and is not intended to limit the present disclosure. Any of modifications, equivalent substitutions, improvements and the like, made within the spirit and principle of the present disclosure shall be covered in the scope of the present disclosure.

The present disclosure may further be understood with clauses as follows.

Clause 1. A team configuration method, comprising:
creating a team according to a received team creation instruction;
obtaining alternative function configuration schemes applicable to the team; and
selecting at least one function configuration scheme from the alternative function configuration schemes such that the selected function configuration scheme is applied to configure functions of the team.

Clause 2. A team configuration method, comprising:
obtaining alternative function configuration schemes applicable to a team; and
selecting at least one function configuration scheme from the alternative function configuration schemes such that the selected function configuration scheme is applied to configure functions of the team.

Clause 3. The method according to clause 2, wherein obtaining alternative function configuration schemes applicable to a team comprises:
determining a team type to which the team belongs according to attribute information of the team; and
obtaining function configuration schemes corresponding to the team type as the alternative function configuration schemes.

Clause 4. The method according to clause 3, wherein the attribute information comprises at least one of:
geographical location information, the number of members, team affiliation information, and industry affiliation information.

Clause 5. The method according to clause 2, wherein the alternative function configuration schemes comprise at least one of:
a preset function configuration scheme, and function configuration schemes adopted by other teams.

Clause 6. The method according to clause 2, wherein an associated display interface of the team comprises a control entry for the functions.

Clause 7. The method according to clause 2, wherein members of the team have control permissions to the functions.

Clause 8. The method according to clause 2, further comprising:
receiving update data for the selected function configuration scheme; and
updating the functions configured for the team according to the update data.

Clause 9. The method according to clause 8, wherein the update data is derived from a scheme update operation implemented by a creator of the selected function configuration scheme.

Clause 10. A team configuration method, comprising:
obtaining alternative configuration schemes applicable to a team; and
selecting at least one configuration scheme from the alternative configuration schemes such that the selected configuration scheme is applied to configure the team.

Clause 11. A team configuration method, comprising:
receiving a scheme switching instruction for a team; and
determining, from function configuration schemes associated with the team, a target function configuration scheme indicated by the scheme switching instruction such that the target function configuration scheme is applied to configure functions of the team.

Clause 12. A team configuration method, comprising:
selecting a target function configuration scheme from function configuration schemes associated with a team such that the target function configuration scheme is applied to configure functions of the team.

Clause 13. A method for sharing a team configuration scheme, comprising:
generating a function configuration scheme corresponding to a team according to functions adopted by the team; and
sharing the function configuration scheme to another team to configure functions of the other team.

Clause 14. A method for sharing a team configuration scheme, comprising:
determining a function configuration scheme adopted by a team; and sharing the function configuration scheme to another team to configure functions of the other team.

Clause 15. The method according to clause 14, wherein sharing the function configuration scheme to another team comprises:

sending the function configuration scheme to the other team; or sharing the function configuration scheme to a shared platform such that the function configuration scheme is pushed by the shared platform to the other team; or sharing the function configuration scheme to the shared platform, wherein the other team has an access permission to the shared platform.

Clause 16. The method according to clause 14, further comprising:

sending update data to the other team when the function configuration scheme is updated, wherein, when the other team adopts the function configuration scheme, the update data is used for updating the functions configured for the other team.

Clause 17. A method for sharing a team configuration scheme, comprising:

generating a function configuration scheme corresponding to a team according to functions adopted by the team; and sharing the function configuration scheme to a shared platform such that the function configuration scheme is pushed by the shared platform to another team to configure functions of the other team; or sharing the function configuration scheme to the shared platform to configure the functions of the other team, wherein the other team has an access permission to the shared platform.

Clause 18. A method for sharing a team configuration scheme, comprising:

determining a function configuration scheme adopted by a team; and sharing the function configuration scheme to a shared platform such that the function configuration scheme is pushed by the shared platform to another team to configure functions of the other team; or sharing the function configuration scheme to the shared platform to configure the functions of the other team, wherein the other team has an access permission to the shared platform.

Clause 19. A team configuration apparatus, comprising:

a creating unit, configured to create a team according to a received team creation instruction;

a first obtaining unit, configured to obtain alternative function configuration schemes applicable to the team; and a first selecting unit, configured to select at least one function configuration scheme from the alternative function configuration schemes such that the selected function configuration scheme is applied to configure functions of the team.

Clause 20. A team configuration apparatus, comprising:

a second obtaining unit, configured to obtain alternative function configuration schemes applicable to a team; and a second selecting unit, configured to select at least one function configuration scheme from the alternative function configuration schemes such that the selected function configuration scheme is applied to configure functions of the team.

Clause 21. The apparatus according to clause 20, wherein the second obtaining unit is specifically configured to determine a team type to which the team belongs according to attribute information of the team; and obtain function configuration schemes corresponding to the team type as the alternative function configuration schemes.

Clause 22. The apparatus according to clause 21, wherein the attribute information comprises at least one of:

geographical location information, the number of members, team affiliation information, and industry affiliation information.

Clause 23. The method according to clause 20, wherein the alternative function configuration schemes comprise at least one of:

a preset function configuration scheme, and function configuration schemes adopted by other teams.

Clause 24. The apparatus according to clause 20, wherein an associated display interface of the team comprises a control entry for the functions.

Clause 25. The apparatus according to clause 20, wherein members of the team have control permissions to the functions.

Clause 26. The apparatus according to clause 20, further comprising:

an update data receiving unit, configured to receive update data for the selected function configuration scheme; and an updating unit, configured to update the functions configured for the team according to the update data.

Clause 27. The apparatus according to clause 26, wherein the update data is derived from a scheme update operation implemented by a creator of the selected function configuration scheme.

Clause 28. A team configuration apparatus, comprising:

a third obtaining unit, configured to obtain alternative configuration schemes applicable to a team; and a third selecting unit, configured to select at least one configuration scheme from the alternative configuration schemes such that the selected configuration scheme is applied to configure the team.

Clause 29. A team configuration apparatus, comprising:

a switching instruction receiving unit, configured to receive a scheme switching instruction for a team; and a switching unit, configured to determine, from function configuration schemes associated with the team, a target function configuration scheme indicated by the scheme switching instruction such that the target function configuration scheme is applied to configure functions of the team.

Clause 30. A team configuration apparatus, comprising:

a fourth selecting unit, configured to select a target function configuration scheme from function configuration schemes associated with a team such that the target function configuration scheme is applied to configure functions of the team.

Clause 31. An apparatus for sharing a team configuration scheme, comprising:

a first generating unit, configured to generate a function configuration scheme corresponding to a team according to functions adopted by the team; and a first sharing unit, configured to share the function configuration scheme to another team to configure the functions of the other team.

Clause 32. An apparatus for sharing a team configuration scheme, comprising:

a first scheme determining unit, configured to determine a function configuration scheme adopted by a team; and a second sharing unit, configured to share the function configuration scheme to another team to configure the functions of the other team.

Clause 33. The apparatus according to clause 32, wherein the second sharing unit is specifically configured to
send the function configuration scheme to the other team; or
share the function configuration scheme to a shared platform such that the function configuration scheme is pushed by the shared platform to the other team; or share the function configuration scheme to the shared platform, wherein the other team has an access permission to the shared platform.

Clause 34. The apparatus according to clause 32, further comprising:
a sending unit, configured to send update data to the other team when the function configuration scheme is updated,
wherein, when the other team adopts the function configuration scheme, the update data is used for updating the functions configured for the other team.

Clause 35. An apparatus for sharing a team configuration scheme, comprising:
a second generating unit, configured to generate a function configuration scheme corresponding to a team according to functions adopted by the team; and
a third sharing unit, configured to share the function configuration scheme to a shared platform such that the function configuration scheme is pushed by the shared platform to another team to configure functions of the other team; or share the function configuration scheme to the shared platform to configure the functions of the other team, wherein the other team has an access permission to the shared platform.

Clause 36. An apparatus for sharing a team configuration scheme, comprising:
a second scheme determining unit, configured to determine a function configuration scheme adopted by a team; and
a fourth sharing unit, configured to share the function configuration scheme to a shared platform such that the function configuration scheme is pushed by the shared platform to another team to configure functions of the other team; or share the function configuration scheme to the shared platform to configure the functions of other team, wherein the other team has an access permission to the shared platform.

What is claimed is:

1. One or more computer readable media storing computer-readable instructions that, executable by one or more processors, cause the one or more processors to perform acts comprising:
obtaining alternative function configuration schemes applicable to a team;
selecting a function configuration scheme from the alternative function configuration schemes, the selecting the function configuration scheme from the alternative function configuration schemes including:
selecting a first function configuration scheme from the alternative function configuration schemes that is applied to a first scenario and a second function configuration scheme from the alternative function configuration schemes that is applied to a second scenario; and
switching between the first function configuration scheme and the second function configuration scheme according to a predefined switching condition;
sharing the function configuration scheme with another team; and
updating functions configured for the another team, in response to determining that the another team adopts the function configuration scheme.

2. The one or more computer readable media of claim 1, wherein the acts further comprise creating the team according to a received team creation instruction.

3. The one or more computer readable media of claim 1, wherein the obtaining the alternative function configuration schemes applicable to the team comprises:
determining a team type to which the team belongs according to attribute information of the team; and
obtaining function configuration schemes corresponding to the team type as the alternative function configuration schemes.

4. The one or more computer readable media of claim 3, wherein the attribute information comprises at least one of:
geographical location information;
a number of members;
team affiliation information; and
industry affiliation information.

5. The one or more computer readable media of claim 1, wherein the alternative function configuration schemes comprise at least one of:
a preset function configuration scheme; and
a function configuration scheme adopted by another team.

6. The one or more computer readable media of claim 1, wherein the acts further comprise displaying an associated display interface of the team, the associated display interface including a control entry for alternative functions.

7. The one or more computer readable media of claim 1, wherein the acts further comprise:
sending update data to the another team, in response to determining that the function configuration scheme is updated.

8. The one or more computer readable media of claim 1, wherein the sharing the function configuration scheme with the another team comprises:
sharing the function configuration scheme with a shared platform such that the function configuration scheme is pushed by the shared platform to the another team; or
sharing the function configuration scheme with the shared platform and enabling the another team to have an access permission to the shared platform.

9. A method comprising:
obtaining alternative function configuration schemes applicable to a team;
selecting a function configuration scheme from the alternative function configuration schemes, the selecting the function configuration scheme from the alternative function configuration schemes including:
selecting a first function configuration scheme from the alternative function configuration schemes that is applied to a first scenario and a second function configuration scheme from the alternative function configuration schemes that is applied to a second scenario; and
switching between the first function configuration scheme and the second function configuration scheme according to a predefined switching condition;
sharing the function configuration scheme with another team; and
updating functions configured for the another team, in response to determining that the another team adopts the function configuration scheme.

10. The method of claim 9, further comprise creating the team according to a received team creation instruction.

11. The method of claim 9, wherein the obtaining the alternative function configuration schemes applicable to the team comprises:
- determining a team type to which the team belongs according to attribute information of the team; and
- obtaining function configuration schemes corresponding to the team type as the alternative function configuration schemes.

12. The method of claim 11, wherein the attribute information comprises at least one of:
- geographical location information;
- a number of members;
- team affiliation information; and
- industry affiliation information.

13. The method of claim 9, wherein the alternative function configuration schemes comprise at least one of:
- a preset function configuration scheme; and
- a function configuration scheme adopted by another team.

14. The method of claim 9, further comprising displaying an associated display interface of the team, the associated display interface including a control entry for alternative functions.

15. The method of claim 9, further comprising sending update data to the another team, in response to determining that the function configuration scheme is updated.

16. The method of claim 9, wherein the sharing the function configuration scheme with the another team comprises:
- sharing the function configuration scheme with a shared platform such that the function configuration scheme is pushed by the shared platform to the another team; or
- sharing the function configuration scheme with the shared platform and enabling the another team to have an access permission to the shared platform.

17. A device comprising:
- one or more processors; and
- one or more computer readable media storing computer-readable instructions that, executable by the one or more processors, cause the one or more processors to perform acts comprising:
  - obtaining alternative function configuration schemes applicable to a team;
  - selecting a function configuration scheme from the alternative function configuration schemes, the selecting the function configuration scheme from the alternative function configuration schemes including:
    - selecting a first function configuration scheme from the alternative function configuration schemes that is applied to a first scenario and a second function configuration scheme from the alternative function configuration schemes that is applied to a second scenario; and
    - switching between the first function configuration scheme and the second function configuration scheme according to a predefined switching condition;
  - sharing the function configuration scheme with another team; and
  - updating functions configured for the another team, in response to determining that the another team adopts the function configuration scheme.

18. The device of claim 17, wherein the obtaining the alternative function configuration schemes applicable to the team comprises:
- determining a team type to which the team belongs according to attribute information of the team; and
- obtaining function configuration schemes corresponding to the team type as the alternative function configuration schemes.

19. The device of claim 17, wherein the acts further comprise displaying an associated display interface of the team, the associated display interface including a control entry for alternative functions.

20. The device of claim 17, wherein the sharing the function configuration scheme with the another team comprises:
- sharing the function configuration scheme with a shared platform such that the function configuration scheme is pushed by the shared platform to the another team; or
- sharing the function configuration scheme with the shared platform and enabling the another team to have an access permission to the shared platform.

* * * * *